(12) United States Patent
Takaoka

(10) Patent No.: US 9,599,004 B2
(45) Date of Patent: Mar. 21, 2017

(54) ABNORMALITY DIAGNOSTIC DEVICE FOR A PARTICULATE FILTER

(71) Applicant: TOYOTA JIDOSHA KABUSHIKI KAISHA, Toyota-shi, Aichi-ken (JP)

(72) Inventor: Kazuya Takaoka, Gotemba (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/844,715

(22) Filed: Sep. 3, 2015

(65) Prior Publication Data

US 2016/0069241 A1 Mar. 10, 2016

(30) Foreign Application Priority Data

Sep. 5, 2014 (JP) ................................. 2014-181766

(51) Int. Cl.
| | | |
|---|---|---|
| *F01N 11/00* | (2006.01) | |
| *F01N 9/00* | (2006.01) | |
| *F01N 3/021* | (2006.01) | |
| *F01N 3/025* | (2006.01) | |

(Continued)

(52) U.S. Cl.
CPC .............. *F01N 11/00* (2013.01); *F01N 3/021* (2013.01); *F01N 3/0253* (2013.01); *F01N 9/00* (2013.01); *F02B 77/083* (2013.01); *B01D 46/0086* (2013.01); *B01D 2279/30* (2013.01); *F01N 2550/04* (2013.01); *F01N 2560/05* (2013.01); *F01N 2610/03* (2013.01);

(Continued)

(58) Field of Classification Search
USPC ......... 60/274, 276, 277, 295, 297, 300, 311; 73/23.2, 23.31, 23.33, 28.01, 28.02
See application file for complete search history.

(56) References Cited

U.S. PATENT DOCUMENTS 8,131,495 B2 * 3/2012 Krafthefer .............. F01N 3/023
204/424
8,561,388 B2 * 10/2013 Yahata .................. F01N 11/007
60/274

(Continued)

FOREIGN PATENT DOCUMENTS

| EP | 2759684 A1 | 7/2014 |
|---|---|---|
| JP | 2011-179467 A | 9/2011 |

(Continued)

*Primary Examiner* — Binh Q Tran
(74) *Attorney, Agent, or Firm* — Andrews Kurth Kenyon LLP

(57) ABSTRACT

Diagnostic accuracy is improved when abnormality diagnosis of a particulate filter is carried out by using a PM sensor arranged in an exhaust passage downstream of the particulate filter. An abnormality diagnostic device for a particulate filter includes a PM sensor arranged in an exhaust passage at the downstream side of the particulate filter so as to output a signal corresponding to an amount of PM deposited in between electrodes which constitute a sensor element, and a filter diagnostic unit to carry out filter diagnostic processing in which abnormality of the particulate filter is diagnosed based on an output value of the PM sensor, wherein it is decided whether to carry out the filter diagnostic processing based on a degree of variation in the output value of the PM sensor before the filter diagnostic processing is carried out.

5 Claims, 10 Drawing Sheets

(51) Int. Cl.
*F02B 77/08* (2006.01)
*B01D 46/00* (2006.01)

(52) U.S. Cl.
CPC ............ *F01N 2900/1402* (2013.01); *F01N 2900/1606* (2013.01); *Y02T 10/47* (2013.01)

(56) References Cited

U.S. PATENT DOCUMENTS

| | | | |
|---|---|---|---|
| 8,627,645 B2* | 1/2014 | Hopka | F01N 3/021 60/274 |
| 8,707,678 B2* | 4/2014 | Zawacki | F02D 41/1494 60/274 |
| 9,151,204 B2* | 10/2015 | Hashida | F01N 11/00 |
| 9,334,773 B2* | 5/2016 | Lin | F01N 3/023 |
| 2012/0144813 A1 | 6/2012 | Yahata et al. | |
| 2014/0216014 A1 | 8/2014 | Hashida et al. | |
| 2015/0132187 A1 | 5/2015 | Takaoka et al. | |

FOREIGN PATENT DOCUMENTS

| | | |
|---|---|---|
| JP | 2012-077716 A | 4/2012 |
| JP | 2012-122399 A | 6/2012 |
| WO | 2013/061422 A1 | 5/2013 |
| WO | 2013/175572 A1 | 11/2013 |

* cited by examiner

ABNORMALITY DIAGNOSTIC DEVICE FOR A PARTICULATE FILTER

CROSS-REFERENCE TO RELATED APPLICATION

The present application claims priority to Japanese Patent Application No. 2014-181766 filed on Sep. 5, 2014, which is incorporated herein by reference in its entirety.

BACKGROUND OF THE INVENTION

Field of the Invention

The present invention relates to an abnormality diagnostic device for a particulate filter which is arranged in an exhaust passage of an internal combustion engine for trapping PM (Particulate Matter) in exhaust gas.

Description of the Related Art

In the past, there has been known a technology in which a particulate filter (hereinafter also simply referred to as "a filter") for trapping PM in exhaust gas is arranged in an exhaust passage of an internal combustion engine. A failure such as melting loss, damage, etc., may occur in the filter. If such a failure of the filter occurs, an amount of PM, which flows out from the filter without being trapped thereby, will increase. When an abnormality occurs in the filter, such as a failure of the filter, removal of the filter from the exhaust passage, etc., an increase of PM to be released into the atmosphere will be caused. Accordingly, there has been developed a technology in which a PM sensor is arranged in the exhaust passage at the downstream side of the filter, so that an abnormality diagnosis of the filter is carried out based on an output value of the PM sensor. As the PM sensor used for such an abnormality diagnosis of the filter, there has been known one which has a pair of electrodes as a sensor element, and which outputs a signal corresponding to an amount of the PM deposited in between the electrodes.

In addition, in Japanese patent laid-open publication No. 2011-179467, there is disclosed a technology in which the presence or absence of a failure of a filter is determined by making a comparison between an output value of a PM sensor, which is arranged in an exhaust passage at the downstream side of the filter, and an estimated value of an amount of PM deposition in the PM sensor. With the technology described in this reference, an amount of PM flowing out from the filter is estimated when assuming that the filter is in a predetermined state. Then, the estimated value of the amount of PM deposition in the PM sensor is calculated based on an integrated value of the amount of outflowing PM. By making a comparison between the estimated value of the amount of PM deposition thus calculated and an actual output value of the PM sensor, it becomes possible to grasp the state or condition of the filter.

Moreover, in Japanese patent laid-open publication No. 2012-122399, there is also disclosed a technology in which failure diagnosis of a filter is made based on the timing at which electrical energization or conduction is started due to the deposition of PM between the electrodes of a PM sensor which is arranged in an exhaust passage at the downstream side of the filter. With this technology described in this reference, in cases where the timing at which electrical conduction or energization between the electrodes of the PM sensor has started earlier than or before a start timing of electrical conduction or energization where it is assumed that the filter has failed, a determination is made that the filter is in failure.

Further, in Japanese patent laid-open publication No. 2012-077716, there is disclosed a technology with respect to the detection of an abnormality in a PM sensor. With the technology described in this reference, the PM deposited in between electrodes of the PM sensor is combusted and removed by being heated by means of a heater. Then, an abnormality in the PM sensor is detected based on a change in the resistance value between the electrodes with respect to a combustion removal period of time.

PRIOR ART REFERENCES

Patent Literatures

[First Patent Literature] Japanese patent laid-open publication No. 2011-179467
[Second Patent Literature] Japanese patent laid-open publication No. 2012-122399
[Third Patent Literature] Japanese patent laid-open publication No. 2012-077716
[Fourth Patent Literature] International laid-open publication No. 2013/175572

SUMMARY

As described above, when a failure of a filter occurs, the amount of PM flowing out from the filter increases. Accordingly, the amount of PM trapped between the electrodes of a PM sensor, which is arranged in an exhaust passage at the downstream side of the filter, increases. As a result, the amount of PM deposition between the electrodes of the PM sensor becomes larger in comparison with the case where the filter is in a normal state. This is also the same as in the case where the filter has been removed from the exhaust passage. For that reason, it becomes possible to carry out abnormality diagnosis of the filter based on an output value of the PM sensor at a predetermined time.

On the other hand, it has been found that the following phenomenon may occur: a part of the PM discharged from the internal combustion engine, before arriving at the PM sensor, once adheres to a wall surface of the exhaust passage, or various kinds of structure arranged in the exhaust passage (hereinafter, referred to as "exhaust system structure"), such as a downstream side end face of the filter, a catalyst, a reducing agent addition device, and so on, and then, the PM thus adhered peels off and arrives at the PM sensor, so that it is trapped between the electrodes of the PM sensor. When such a phenomenon has occurred, the amount of PM trapped between the electrodes of the PM sensor will increase more than that in normal or ordinary time, in spite of the fact that the filter is in the normal state. Accordingly, in cases where the phenomena as mentioned above has occurred, when abnormality diagnosis of the filter is carried out based on the output value of the PM sensor, there is a fear that a wrong diagnosis may be made that abnormality of the filter has occurred, in spite of the fact that the filter is actually in the normal state.

Embodiments of the present invention have been made in view of the problems as mentioned above, and has for an object to improve diagnostic accuracy in the case of carrying out abnormality diagnosis of a filter by using an output value of a PM sensor arranged in an exhaust passage at the downstream side of the filter.

Embodiments of the present invention are to decide whether filter diagnostic processing is carried out based on a degree of variation in an output value of a PM sensor before the time when the filter diagnostic processing is carried out in which abnormality of a filter is diagnosed based on the output value of the PM sensor.

More specifically, an abnormality diagnostic device for a particulate filter according to an embodiment of the present invention, in which abnormality of the particulate filter is arranged in an exhaust passage of an internal combustion engine for trapping PM in exhaust gas is diagnosed, comprises:

a PM sensor that is arranged in the exhaust passage at the downstream side of the particulate filter, has a pair of electrodes as a sensor element, and outputs a signal corresponding to an amount of PM deposition when the electrodes are made conductive with each other due to the deposition of PM between said electrodes;

a sensor regeneration unit that carries out sensor regeneration processing in which the PM deposited between the electrodes of the PM sensor is removed;

a voltage application unit that starts voltage application to the electrodes of said PM sensor at a predetermined voltage application time after the execution of the sensor regeneration processing by said sensor regeneration unit ends;

a filter diagnostic unit that carries out filter diagnostic processing in which abnormality of the particulate filter is diagnosed based on an output value of said PM sensor when a predetermined determination period of time has elapsed from the voltage application time;

a monitor unit that continuously monitors the output signal of the PM sensor on and after said voltage application time; and a decision unit that decides whether the filter diagnostic processing is to be carried out by the filter diagnostic unit, based on a degree of variation in the output value of said PM sensor monitored by said monitor unit on and after an output starting time at which the output value of said PM sensor begins to go up from zero, in a period of time in which said determination period of time elapses after said voltage application time.

In the PM sensor according to an embodiment of the present invention, when an amount of PM deposited in between the electrodes, which constitute a sensor element, becomes equal to or more than a fixed amount, the electrodes are made conductive with each other due to the PM thus deposited. Here, an amount of PM deposition between the electrodes of the PM sensor at which the electrodes are put into a conductive state by due to the PM is referred to as "an effective amount of PM deposition". In other words, in the PM sensor according to an embodiment of the present invention, when the amount of PM deposition between the electrodes reaches the effective amount of PM deposition after voltage application to the electrodes due to the voltage application unit is started, the output value of the PM sensor begins to go up from zero. Hereinafter, the time at which the output value of the PM sensor begins to go up from zero is referred to as "the output starting time".

Here, the PM contained in the exhaust gas discharged from the internal combustion engine is referred to as "ordinary PM". On the other hand, the PM, which once adhered to a wall surface of the exhaust passage or an exhaust system structure and then peeled off from the wall surface or the exhaust system structure, is referred to as "peeled PM". When PM adheres to the wall surface of the exhaust passage or the exhaust system structure, the PM deposits and condenses on the wall surface or the exhaust system structure. The PM thus condensed peels off to become "the peeled PM". For that reason, the size of the peeled PM is larger than that of the ordinary PM.

When the amount of PM deposition between the electrodes of the PM sensor is gradually increased to reach the effective amount of PM deposition by the ordinary PM being trapped between the electrodes, the electrodes are made conductive with each other through the ordinary PM, so that the output value of the PM sensor begins to rise or increase. Then, thereafter, when the amount of PM deposition between the electrodes gradually increases due to the continued trapping of the ordinary PM, the output value of the PM sensor gradually rises or increases in accordance with the increasing amount of PM deposition. On the other hand, in cases where the peeled PM is trapped in between the electrodes in a state where the amount of deposition of the ordinary PM between the electrodes has not reached the effective amount of PM deposition, the size of the peeled PM is larger than that of the ordinary PM, so the electrodes will be made electrically conductive with each other due to the peeled PM. In addition, in cases where the peeled PM has been trapped in a state where the amount of deposition of the ordinary PM between the electrodes is equal to or larger than the effective amount of PM deposition, too, the electrodes will be made electrically conductive with each other due to the peeled PM in a position which is different from that in which the electrodes are electrically conductive with each other through the ordinary PM. For that reason, in cases where the peeled PM has been trapped between the electrodes of the PM sensor, the output value of the PM sensor exhibits a behavior different from that where the ordinary PM has been trapped between the electrodes.

Accordingly, in an embodiment of the present invention, the output signal of the PM sensor, on and after the voltage application time at which the voltage application to the electrodes of the PM sensor is started by the voltage application unit, is continuously monitored by the monitor unit. With this, it becomes possible to grasp the behavior of the output value of the PM sensor in a continuous manner. Then, based on the degree of variation in the output value of the PM sensor on and after the output starting time in the period of time in which the determination period of time elapses from the voltage application time, it is decided by the decision unit whether the filter diagnostic processing is to be carried out by the filter diagnostic unit. In other words, when the degree of variation of the output value of the PM sensor on and after the output starting time shows that the peeled PM has been trapped between the electrodes of the PM sensor, the decision unit decides that the filter diagnostic processing by the filter diagnostic unit is not to be carried out.

According to this, in cases where the peeled PM has been trapped between the electrodes of the PM sensor before the determination period of time has elapsed from the voltage application time, the filter diagnostic processing will not be carried out. For that reason, it is possible to suppress the filter diagnostic unit from making an erroneous diagnosis that abnormality of the filter has occurred, resulting from the peeled PM being trapped between the electrodes of the PM sensor, in spite of the fact that the filter is actually in a normal state. Accordingly, according to an embodiment of the present invention, it is possible to improve diagnostic accuracy in the case of carrying out abnormality diagnosis of the filter by using the output value of the PM sensor.

The abnormality diagnostic device for a filter according to embodiments of the present invention may be further provided with a rise rate calculation unit that calculates a rate of rise of an sensor output, which is an amount of rise of the output value of the PM sensor monitored by the monitor unit, per unit amount of increase of a reference amount of PM deposition between the electrodes. Here, the reference amount of PM deposition is an estimated value of the amount of PM deposition between the electrodes of the PM sensor in the case of assuming that the filter is in a reference failure state. The reference failure state is a failure state in which the extent of a failure is the smallest among the states in which it should be determined that abnormality has occurred in the filter, in the abnormality diagnosis of the filter. Then, the rate of rise of the sensor output is an amount of rise of an actual output value of the PM sensor in a period of time in which the estimated reference amount of PM deposition increases by a unit amount. In embodiments of the present invention, in cases where the rate of rise of the sensor output calculated by the rise rate calculation unit has become larger than a predetermined first determination rise rate on and after the output starting time, the decision unit may decide that the filter diagnostic processing by the filter diagnostic unit is not to be carried out.

In the case where the electrodes are made conductive with each other by the peeled PM being trapped in a state where the amount of deposition of the ordinary PM between the electrodes has not reached the effective amount of PM deposition, the output value of the PM sensor will go up at the output starting time more rapidly than in the case where the amount of PM deposition between the electrodes becomes equal to or more than the effective amount of PM deposition due to the gradually increasing amount of deposition of the ordinary PM. In addition, when the peeled PM is trapped between the electrodes of the PM sensor after the output starting time, the electrodes are made conductive with each other through the peeled PM also in a position different from that in which the electrodes are conductive with each other through the ordinary PM in the electrodes. In this case, too, the output value of the PM sensor will go up more rapidly, as compared with the case in which the output value of the PM sensor goes up in accordance with the gradually increasing amount of PM deposition between the electrodes by trapping of the ordinary PM. For that reason, in cases where the output value of the PM sensor has gone up rapidly on and after the output starting time, the degree of variation of the output value of the PM sensor shows, with high probability, that the peeled PM has been trapped between the electrodes of the PM sensor.

Accordingly, in the above-mentioned configuration, in the case where on and after the output starting time, the rate of rise of the sensor output has become larger than the predetermined first determination rise rate, it is decided by the decision unit that the filter diagnostic processing by the filter diagnostic unit is not to be carried out. According to this, in cases where the peeled PM has been trapped between the electrodes of the PM sensor, the filter diagnostic processing by the filter diagnostic unit will not be carried out.

Here, note that in the above-mentioned configuration, the first determination rise rate may be set to a value equal to or larger than a maximum value of the rate of rise of the sensor output (hereinafter referred to as an "ordinary rate of rise of the sensor output") when the output value of the PM sensor increases according to the increasing amount of PM deposition, where the amount of PM deposition between the electrodes has been increased by trapping of the ordinary PM between the electrodes. Here, the maximum value of the ordinary rate of rise of the sensor output can be specified, for example, as an ordinary rate of rise of the sensor output in the case of assuming that the filter does not exist in the exhaust passage.

In embodiments of the present invention, in cases where the rate of rise of the sensor output calculated by the rise rate calculation unit has become smaller than a predetermined second determination rise rate after the output starting time, the decision unit may decide that the filter diagnostic processing by the filter diagnostic unit is not to be carried out.

The ordinary PM is continuously trapped between the electrodes of the PM sensor. For that reason, in cases where the output value of the PM sensor begins to go up from zero when the amount of deposition of the ordinary PM between the electrodes reaches the effective amount of PM deposition, the output value of the PM sensor goes up continuously in accordance with the continuous increase in the amount of deposition of the ordinary PM, even after the output starting time. This is the same as the case where the filter is in a normal state, and in the case where abnormality has occurred in the filter. On the other hand, peeling of the PM from the wall surface of the exhaust passage does not occur continuously. For that reason, the peeled PM is not continuously trapped between the electrodes of the PM sensor. Accordingly, a rapid rise in the output value of the PM sensor resulting from the peeled PM trapped between the electrodes is temporary. For that reason, in the case where the electrodes are made conductive with each other by the peeled PM being trapped in the state where the amount of deposition of the ordinary PM between the electrodes has not reached the effective amount of PM deposition, the output value of the PM sensor goes up rapidly at the output starting time, as stated above, but thereafter, the output value of the PM sensor will not go up substantially until the amount of deposition of the ordinary PM reaches the effective amount of PM deposition by continuous trapping of the ordinary PM. In other words, after the output value of the PM sensor has gone up rapidly at the output starting time, there will occur a period of time during which the output value of the PM sensor does not go up substantially. In addition, after the peeled PM has been trapped between the electrodes of the PM sensor, a part of the peeled PM may be desorbed from between the electrodes. In this case, the amount of PM deposition between the electrodes will be decreased, so that the output value of the PM sensor decreases. If that is a case, the rate of rise of the sensor output will become a negative value. Accordingly, in cases where after the output starting time, there has occurred a period of time in which the output value of the PM sensor does not go up substantially or the rate of rise of the sensor output has become a negative value, the degree of variation of the output value of the PM sensor shows, with high probability, that the peeled PM has been trapped between the electrodes of the PM sensor.

Accordingly, in the above-mentioned configuration, in the case where after the output starting time, the rate of rise of the sensor output has become smaller than the predetermined second determination rise rate, it is decided by the decision unit that the filter diagnostic processing by the filter diagnostic unit is not to be carried out. According to this, in cases where the peeled PM has been trapped between the electrodes of the PM sensor, the filter diagnostic processing by the filter diagnostic unit will not be carried out.

Here, note that in the above-mentioned configuration, the second determination rise rate may be set as a value equal to or less than a minimum value of the ordinary rate of rise of the sensor output. Here, the minimum value of the ordinary rate of rise of the sensor output can be specified, for example, as an ordinary rate of rise of the sensor output in the case of assuming that the filter has not been deteriorated (i.e., the filter is new).

Moreover, in embodiments of the present invention, in cases where the rate of rise of the sensor output calculated by the rise rate calculation unit decreased after the output starting time, the decision unit may also decide that the filter diagnostic processing by the filter diagnostic unit is not to be carried out.

As mentioned above, in cases where the output value of the PM sensor begins to go up because the amount of deposition of the ordinary PM between the electrodes reaches the effective amount of PM deposition, the output value of the PM sensor goes up continuously in accordance with the continuous increase in the amount of deposition of the ordinary PM, even after the output starting time. At this time, the larger the amount of PM deposition between the electrodes of the PM sensor, the larger the amount of rise of the output value of the PM sensor occurs with respect to an amount of increase in the amount of PM deposition. Accordingly, in cases where the output value of the PM sensor goes up in accordance with the continuous increase in the amount of deposition of the ordinary PM between the electrodes, the rate of rise of the sensor output will go up gradually on and after the output starting time. On the other hand, the rapid rise in the output value of the PM sensor resulting from the peeled PM trapped between the electrodes is temporary. Thus, in the case where the electrodes are made conductive with each other by the peeled PM being trapped in the state where the amount of deposition of the ordinary PM between the electrodes has not reached the effective amount of PM deposition, there occurs a period of time during which the output value of the PM sensor does not go up substantially, after the output value of the PM sensor has gone up rapidly at the output starting time. In addition, even in cases where the output value of the PM sensor has gone up rapidly due to the peeled PM being trapped, after the output value of the PM sensor began to go up because the amount of deposition of the ordinary PM between the electrodes reaches the effective amount of PM deposition, the rate of rise of the sensor output decreases to a value corresponding to the continuous increase in the amount of deposition of the ordinary PM, after the rapid rise of the output value of the PM sensor. Moreover, in cases where a part of the peeled PM has desorbed from between the electrodes after the peeled PM was trapped between the electrodes of the PM sensor, the rate of rise of the sensor output decreases to a negative value. Accordingly, in cases where the rate of rise of the sensor output decreased after the output starting time, the degree of variation of the output value of the PM sensor shows, with high probability, that the peeled PM has been trapped between the electrodes of the PM sensor.

Accordingly, in the above-mentioned configuration, in the case where the rate of rise of the sensor output decreased after the output starting time, it is decided by the decision unit that the filter diagnostic processing by the filter diagnostic unit is not to be carried out. According to this, in cases where the peeled PM has been trapped between the electrodes of the PM sensor, the filter diagnostic processing by the filter diagnostic unit will not be carried out.

Here, note that in cases where the abnormality diagnostic device for a particulate filter according to the present invention is provided with an electronic control unit (ECU) which controls the internal combustion engine, or a sensor control unit (SCU) which controls the PM sensor, the ECU or SCU may have a function to determine whether it has the output starting time has occurred after the voltage application time.

According to embodiments of the present invention, it is possible to improve diagnostic accuracy in the case of carrying out abnormality diagnosis of a filter by using an output value of a PM sensor arranged in an exhaust passage at the downstream side of the filter.

The above and other objects, features and advantages of embodiments of the present invention will become more readily apparent to those skilled in the art from the following detailed description of preferred embodiments taken in conjunction with the accompanying drawings.

BRIEF DESCRIPTION OF THE DRAWINGS

FIGS. 5(a) and 5(b) are image views showing how PM deposits between the electrodes of the PM sensor according to the embodiment, wherein FIG. 5(a) shows a state in which ordinary PM is trapped between the electrodes, and FIG. 5(b) shows a state in which the PM deposits including peeled PM are trapped between the electrodes.

DETAILED DESCRIPTION

Hereinafter, specific embodiments of the present invention will be described based on the attached drawings. However, the dimensions, materials, shapes, relative arrangements and so on of component parts described in the embodiments are not intended to limit the technical scope of the present invention to these alone in particular as long as there are no specific statements.

First Embodiment

Figure 1:
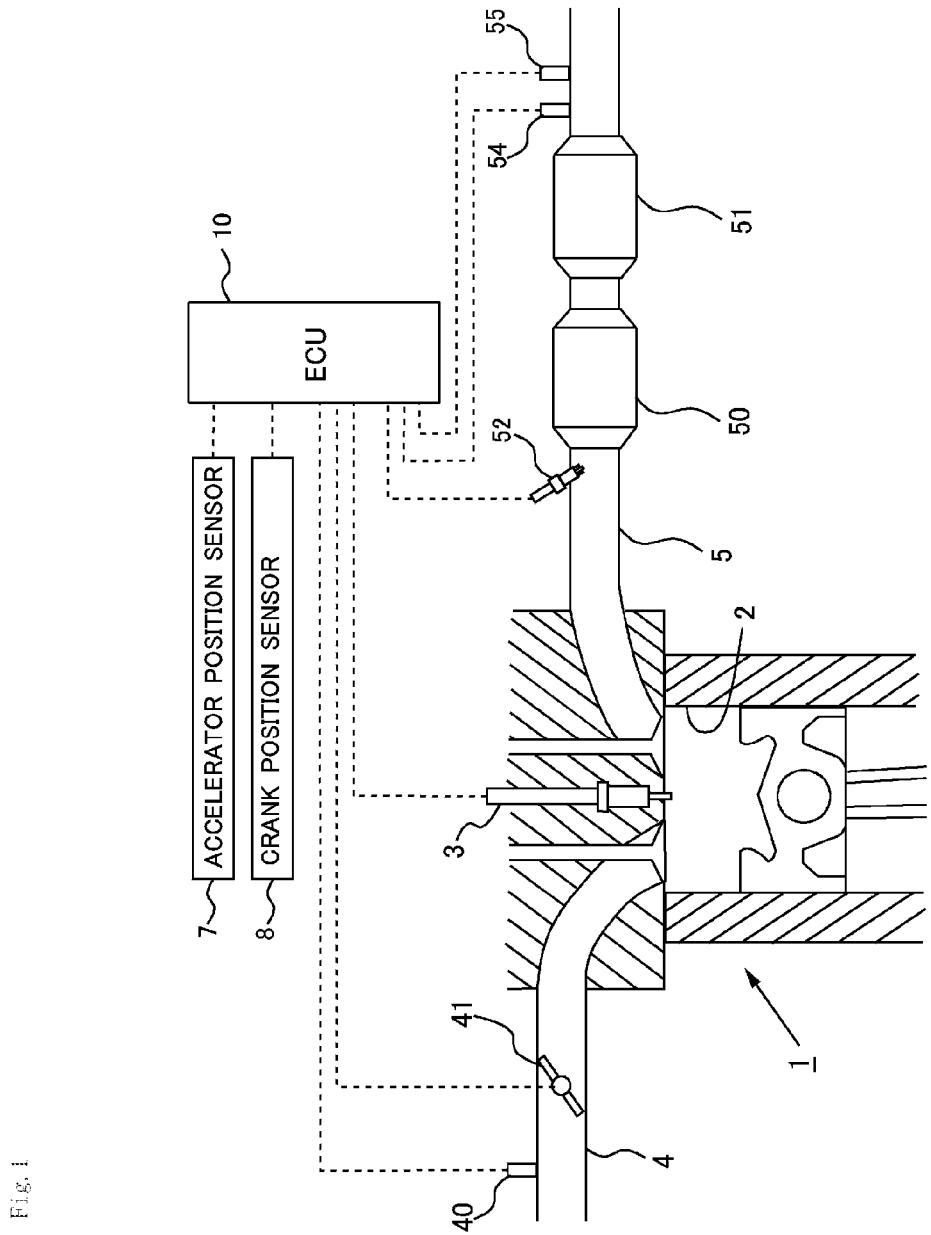
FIG. 1 is a view showing the schematic construction of an internal combustion engine and its intake and exhaust systems according to an embodiment of the present invention.

FIG. 1 is a view showing the schematic construction of an internal combustion engine and its intake and exhaust systems according to an embodiment of the present invention. The internal combustion engine 1 shown in FIG. 1 is an internal combustion engine of compression ignition type (diesel engine) using light oil as fuel. Here, note that the internal combustion engine 1 may also be an internal combustion engine of spark ignition type using gasoline, etc., as fuel.

The internal combustion engine 1 is provided with a fuel injection valve 3 for injecting fuel into a cylinder 2. Here, note that in cases where the internal combustion engine 1 is an internal combustion engine of spark ignition type, the fuel injection valve 3 may be constructed such that fuel is injected to an intake port.

The internal combustion engine 1 is connected to an intake passage 4. In the intake passage 4, there are arranged an air flow meter 40 and an intake throttle valve 41. The air flow meter 40 is a sensor that outputs an electrical signal corresponding to an amount (mass) of intake air (air) flowing in the intake passage 4. The intake throttle valve 41 is arranged in the intake passage 4 at the downstream side of the air flow meter 40. The intake throttle valve 41 serves to adjust the amount of intake air in the internal combustion engine 1 by changing the channel cross section of the intake passage 4.

The internal combustion engine 1 is connected to an exhaust passage 5. In the exhaust passage 5, there are arranged an oxidation catalyst 50 and a particulate filter (hereinafter, referred to as a "filter") 51. The filter 51 is arranged in the exhaust passage 5 at the downstream side of the oxidation catalyst 50. The filter 51 is a wall flow type filter composed of a porous substrate, and serves to trap PM contained in the exhaust gas.

A fuel addition valve 52 is arranged in the exhaust passage 5 at the upstream side of the oxidation catalyst 50. The fuel addition valve 52 adds fuel into the exhaust gas flowing through the interior of the exhaust passage 5. A temperature sensor 54 and a PM sensor 55 are arranged in the exhaust passage 5 at the downstream side of the filter 51. The temperature sensor 54 outputs a signal corresponding to the temperature of the exhaust gas. The PM sensor 55 outputs an electrical signal which has a correlation with an amount of PM flowing out of the filter 51.

Figure 2:
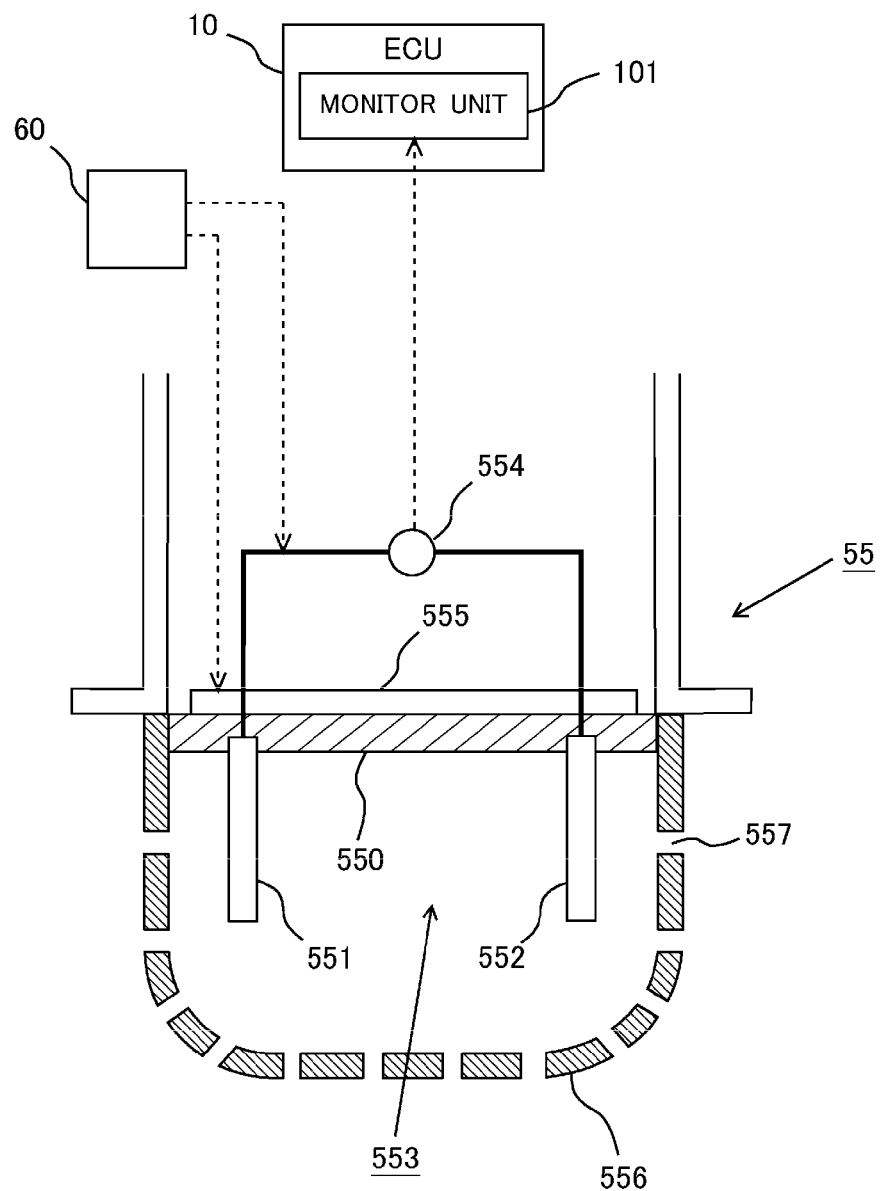
FIG. 2 is a view schematically showing the construction of a PM sensor according to the embodiment.

Here, a schematic construction of the PM sensor 55 will be explained based on FIG. 2. FIG. 2 is a view showing the schematic construction of the PM sensor 55. The PM sensor 55 is an electrode type PM sensor. Here, note that in FIG. 2, one pair of electrodes is illustrated, but instead, a plurality of pairs of electrodes may be provided.

The PM sensor 55 is provided with a sensor element 553, an ammeter 554, a heater 555, and a cover 556. The sensor element 553 is composed of a pair of electrodes 551, 552 which are arranged on a front surface of a plate-shaped insulating material 550 in a mutually spaced apart manner. The ammeter 554 measures an electric current flowing between the electrodes 551, 552. The heater 555 is an electrically heated type heater which is arranged on a back surface of the insulating material 550. The cover 556 serves to cover the sensor element 553. A plurality of through holes 557 are formed in the cover 556. Electric power is supplied to the electrodes 551, 552 and the heater 555 of the PM sensor 55 from a power supply 60 which is provided outside the PM sensor 55. Then, from the PM sensor 55, there is outputted an output value corresponding to the value of the current measured by the ammeter 554. This output value of the PM sensor 55 is inputted to a monitor unit 101 in an ECU 10. In other words, in this embodiment, it is possible to monitor the output value of the PM sensor 55 continuously by means of the monitor unit 101 of the ECU 10. Here, note that in cases where the PM sensor 55 is provided with a sensor control unit (SCU) which controls the PM sensor 55, the SCU may be provided with a monitor unit which monitors the output value of the PM sensor 55 in a continuous manner.

When the PM sensor 55 constructed as mentioned above is mounted on the exhaust passage 5, a part of the exhaust gas flowing through the exhaust passage 5 passes through the through holes 557, so that it flows into the cover 556. Then, the PM contained in the exhaust gas having flowed into the cover 556 is trapped between the electrodes 551, 552. At this time, when a voltage is applied to the electrodes 551, 552, trapping of the PM between the electrodes 551, 552 is promoted.

Figure 3:
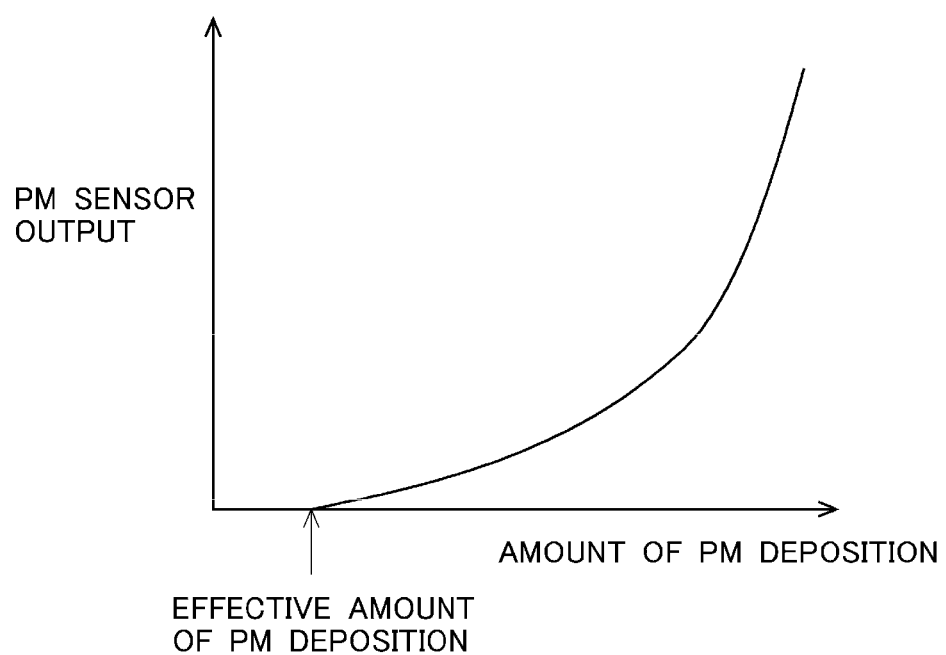
FIG. 3 is a view showing the relation between an amount of PM deposition between electrodes of the PM sensor and an output value of the PM sensor according to the embodiment.

Here, the relation between the amount of PM deposition between the electrodes 551, 552 and the output value of the PM sensor 55 will be explained based on FIG. 3. In FIG. 3, the axis of abscissa represents the amount of PM deposition between the electrodes 551, 552, and the axis of ordinate represents the output value of the PM sensor 55. When PM is trapped between the electrodes 551, 552, the amount of PM deposition between the electrodes 551, 552 increases gradually. At this time, in cases where a voltage is applied between the electrodes 551, 552, the electrodes 551, 552 become conductive with each other through PM having electric conductivity, at the time when a fixed amount of PM deposits between the electrodes 551, 552 is connected from one electrode 551 to the other electrode 552. However, when the amount of PM deposition between the electrodes 551, 552 is less than a fixed amount, the electrodes 551, 552 are in a non-conductive state. Here, an amount of PM deposition at which the electrodes 551, 552 become conductive with each other is referred to as an "effective amount of PM deposition".

As shown in FIG. 3, the electrodes 551, 552 are in a non-conductive state until the amount of PM deposition between the electrodes 551, 552 reaches the effective amount of PM deposition, and hence, the output value of the PM sensor 55 is zero. Then, when the amount of PM deposition between the electrodes 551, 552 reaches the effective amount of PM deposition, the output value of the PM sensor 55 becomes larger than zero. After the amount of PM deposition between the electrodes 551, 552 has reached the effective amount of PM deposition, an electric resistance between the electrodes 551, 552 becomes smaller in accordance with the increase in the amount of PM deposition between the electrodes 551, 552. As a result, the electric current flowing between the electrodes 551, 552 becomes large. Accordingly, the output value of the PM sensor 55 becomes larger in accordance with the increase in the amount of PM deposition between the electrodes 551, 552. Hereinafter, the time at which the output value of the PM sensor 55 begins to go up from zero is referred to as an "output starting time". In addition, the larger the amount of PM deposition between the electrodes 551, 552 of the PM sensor 55, the larger an amount of decrease in the electric resistance between the electrodes 551, 552 will occur, and hence, the larger the amount of increase of the electric current flowing between the electrodes 551, 552. For that reason, the larger the amount of PM deposition between the electrodes 551, 552 of the PM sensor 55, the larger the amount of rise of the output value of the PM sensor 55 will occur.

Here, reverting to FIG. 1, the electronic control unit (ECU) 10 is provided in combination with the internal combustion engine 1. This ECU 10 is a unit that controls an operating state, etc., of the internal combustion engine 1. A variety of kinds of sensors such as an accelerator position sensor 7, a crank position sensor 8, etc. In addition to the above-mentioned air flowmeter 40, the temperature sensor and 54 and the PM sensor 55, are electrically connected to the ECU 10. The accelerator position sensor 7 is a sensor which outputs an electrical signal correlated with an amount of operation (accelerator opening) of an unillustrated accelerator pedal. The crank position sensor 8 is a sensor which outputs an electrical signal correlated with the rotational position of an engine output shaft (crankshaft) of the internal combustion engine 1. The output signals of these sensors are inputted to the ECU 10. In addition, a variety of kinds of equipment such as the above-mentioned fuel injection valve 3, the intake throttle valve 41, the fuel addition valve 52, and so on are electrically connected to the ECU 10. The ECU 10 controls the above-mentioned variety of kinds of equipment based on the output signals of the individual sensors as mentioned above. For example, the ECU 10 carries out filter regeneration processing in which the PM deposited on the filter 51 is removed by performing the addition of fuel from the fuel injection valve 52. In the filter regeneration processing, the temperature of the filter 51 is caused to rise due to the heat of oxidation generated by the oxidation of fuel added from the fuel addition valve 52 in the oxidation catalyst 50. As a result, the PM deposited on the filter 51 is burned and removed.

Here, note that in this embodiment, in the exhaust passage 5, an NOx selective catalytic reduction catalyst is not provided that serves to reduce the NOx in the exhaust gas by using ammonia as a reducing agent. Also, a urea addition valve is not provided that serves to supply urea to the NOx selective catalytic reduction catalyst. However, the present invention can also be applied to an internal combustion engine which has an NOx selective catalytic reduction catalyst and a urea addition valve arranged in an exhaust passage. In this case, the NOx selective catalytic reduction catalyst and the urea addition valve may be arranged either at the upstream side or at the downstream side of a PM sensor.

[Filter Abnormality Diagnosis]

In the filter 51, a failure such as damage, melting loss, etc., may occur, resulting from a temperature rise accompanying the execution of the above-mentioned filter regeneration processing. When such a failure of the filter 51 occurs, or when filter abnormality such as removal of the filter 51 from the exhaust passage 5 occurs, an increase of PM to be released into the atmosphere will be caused. Accordingly, in this embodiment, abnormality diagnosis of the filter 51, which determines the presence or absence of filter abnormality, is carried out by using the output value of the PM sensor 55. In the following, a failure diagnosis method for a filter according to this embodiment will be explained.

In the abnormality diagnosis method for a filter in this embodiment, first, sensor regeneration processing is carried out in order to remove the PM deposited between the electrodes 551, 552 of the PM sensor 55. Specifically, by supplying electric power to the heater 555 from the power supply 60, the sensor element 553 is heated by means of the heater 555. As a result, the PM deposited between the electrodes 551, 552 is oxidized and removed. Here, note that in the sensor regeneration processing, by adjusting the amount of power supply to the heater 555, the temperature of the sensor element 553 is controlled to a temperature at which the PM can be oxidized.

After the PM deposited between the electrodes 551, 552 is removed by the sensor regeneration processing, voltage application to the electrodes 551, 552 from the power supply is started. Hereinafter, the time when the voltage application to the electrodes 551, 552 is started is referred to as the "voltage application time". Here, note that the electrodes 551, 552 are at high temperature for a while after the end of the sensor regeneration processing. For that reason, a cooling-off period for cooling the electrodes 551, 552 may be interposed between from the end of the sensor regeneration processing until the voltage application time.

Figure 4:
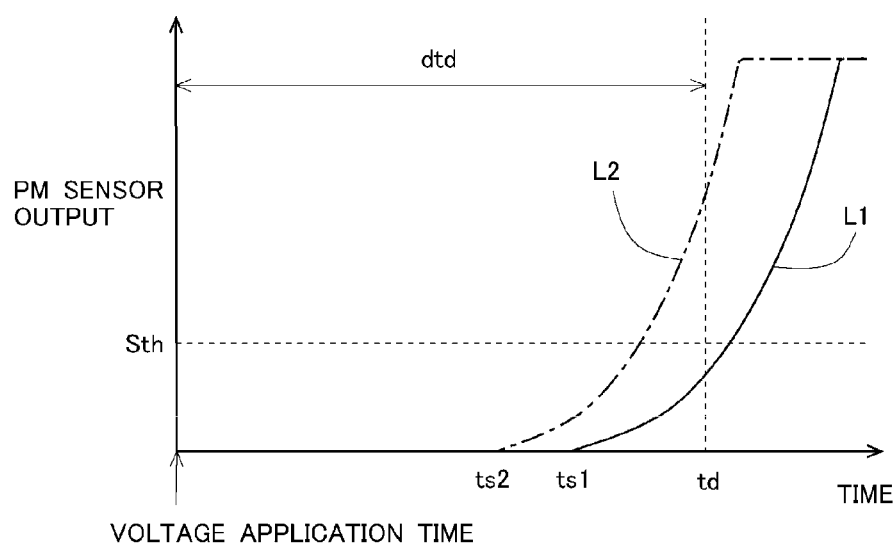
FIG. 4 is a first view showing the change over time of the output value of the PM sensor on and after a voltage application time according to the embodiment.

Here, the behavior of the output value of the PM sensor 55 on and after the start of the voltage application to the electrodes 551, 552 will be explained based on FIG. 4. FIG. 4 is a view showing the change over time of the output value of the PM sensor 55 after a voltage application time. In FIG. 4, the axis of abscissa represents a period of time elapsed from the voltage application time, and the axis of ordinate represents the output value of the PM sensor 55. In addition, in FIG. 4, a line L1 indicates the change overtime of the output value of the PM sensor 55 in the case where the filter 51 is normal, and a line L2 indicates the change over time of the output value of the PM sensor 55 in the case where the filter 51 is in failure. Here, note that the change over time of the output value of the PM sensor 55 in the case where the filter 51 is removed from the exhaust passage 5 exhibits the same tendency as in the case where the filter 51 is in failure, with respect to the change over time of the output value of the PM sensor 55 in the case where the filter 51 is in a normal state. Moreover, in FIG. 4, ts1 indicates the output starting time in the case where the filter 51 is in the normal state, and ts2 indicates the output starting time in the case where the filter 51 is in failure. Note that the behavior of the output value of the PM sensor 55 as shown in FIG. 4 can be monitored by the monitor unit 101 of the ECU 10.

When the filter 51 fails, the PM trapping efficiency of the filter 51 decreases. For that reason, an amount of PM flowing out of the filter 51 per unit time (i.e., an amount of outflow PM) increases. With this, the amount of the PM, which arrives at the PM sensor 55 and is trapped between the electrodes 551, 552, also increases. In other words, the rate of increase of the amount of PM deposition between the electrodes 551, 552 becomes large. As a result, when the filter 51 is in failure, the amount of PM deposition between the electrodes 551, 552 will reach an effective amount of PM deposition at an earlier period of time compared to when the filter 51 is in the normal state. Accordingly, as shown in FIG. 4, in cases where the filter 51 is in failure, a period of time from the voltage application time until the output starting time becomes shorter (ts2<ts1) in comparison with the case where the filter 51 is in the normal state. In addition, when the filter 51 is in failure, the rate of increase of the amount of PM deposition between the electrodes 551, 552 on and after the output starting time also becomes larger, in comparison with the time when the filter 51 is in the normal state. Accordingly, as shown in FIG. 4, in cases where the filter 51 is in failure, an amount of rise per unit time of the output value of the PM sensor 55 on and after the output starting time becomes larger, in comparison with the case where the filter 51 is in the normal state.

Between the time when the filter 51 is in the normal state, and the time when abnormality has occurred in the filter 51, the differences as mentioned above occur in the behavior of the output value of the PM sensor 55. As a result of abnormality occurring in the filter 51, the output value of the PM sensor 55 after the lapse of a fixed period of time from the voltage application time becomes larger than that in the case where the filter 51 is in the normal state. Accordingly, in the abnormality diagnosis method for a filter according to this embodiment, the output value of the PM sensor 55 at a determination point in time td after the lapse of a predetermined determination period of time dtd from the voltage application time is read in. Then, in cases where the output value of the PM sensor 55 thus read in is equal to or larger than a predetermined abnormality determination value Sth, a determination is made that abnormality of the PM sensor 55 has occurred.

Here, the determination period of time dtd is set as a period of time from the voltage application time until a reference value of the amount of PM deposition (hereinafter, referred to as a "reference amount of PM deposition") between the electrodes 551, 552 of the PM sensor 55 reaches a predetermined determination amount. The reference amount of PM deposition is a value which is estimated by assuming that the filter 51 is in the reference failure state. The reference failure state is a failure state in which the extent of a failure is the smallest among the states in which it should be determined that abnormality has occurred in the filter 51, in the abnormality diagnosis of the filter. In other words, even if the filter 51 is in a state where it has deteriorated to some extent, when that state is better than the reference failure state, a determination is made in the abnormality diagnosis of the filter that the filter 51 is in the normal state. In addition, the failure determination value Sth is set to the output value of the PM sensor 55 in the case where the amount of PM deposition between the electrodes 551, 552 of the PM sensor 55 is the determination amount of PM deposition.

The reference amount of PM deposition is calculated by estimating an amount of the PM trapped between the electrodes 551, 552 of the PM sensor 55 (hereinafter, simply referred to as an "amount of trapped PM") when it is assumed that the filter 51 is in the reference failure state, and then integrating this estimated value of the amount of trapped PM. Here, note that even in the case where the state of the filter 51 itself is the same, the amount of outflow PM from the filter 51 varies according to an operating state of the internal combustion engine 1 (e.g., an amount of fuel injection from the fuel injection valve 3, the flow rate of the exhaust gas, etc.) or the amount of PM deposition in the filter 51. In addition, the rate or proportion of the PM trapped between the electrodes 551, 552 of the PM sensor 55 (hereinafter, referred to as a PM trapping rate) among the amount of PM contained in the exhaust gas also varies according to the flow rate of the exhaust gas. For that reason, at the time of estimating the amount of trapped PM on the assumption that the filter 51 is in the reference failure state, the operating state of the internal combustion engine 1 and the amount of PM deposition in the filter 51 are also taken into consideration. Here, note that as a specific calculation method of the reference amount of PM deposition, there can be used any well-known method.

[Peeled PM]

Figure 5:
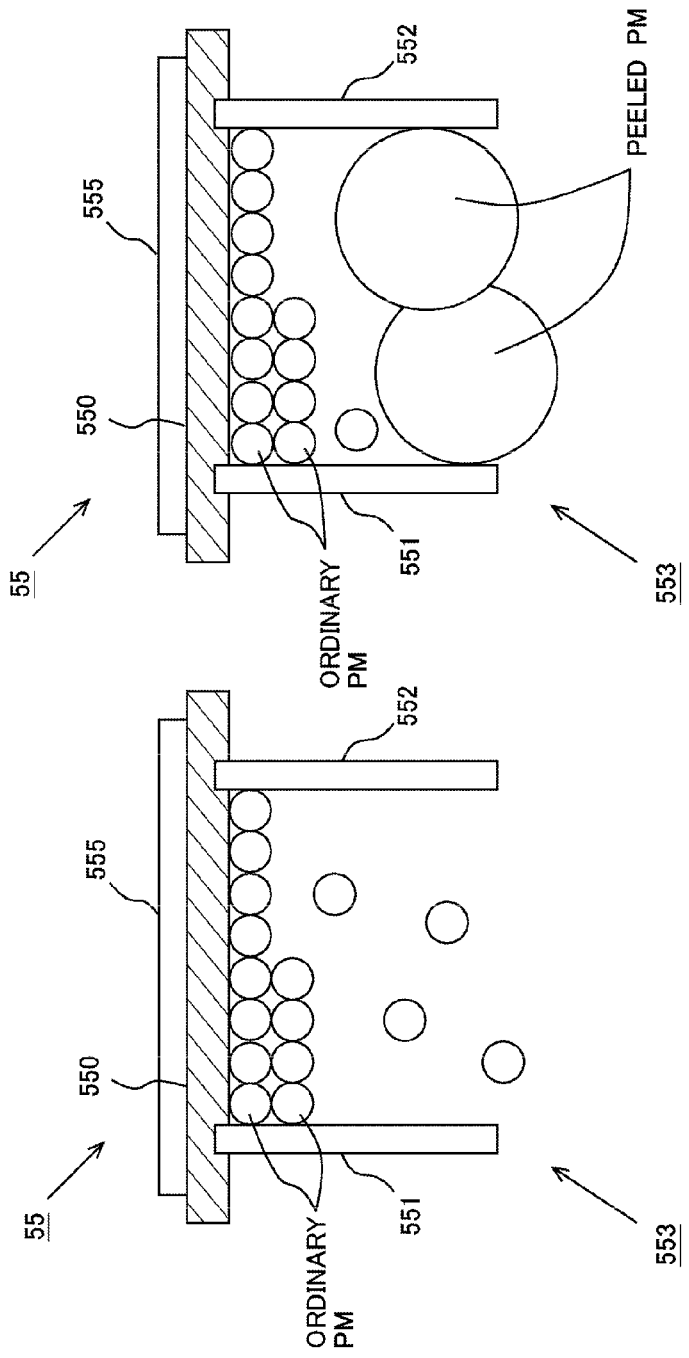

In this embodiment, a part of the PM in the exhaust gas adheres to a wall surface of the exhaust passage 5, a downstream side end face of the filter 51, or an exhaust system structure such as the oxidation catalyst 50, and so on. Then, there may occur a phenomenon in which peeled PM, which is the PM once having adhered to the wall surface of the exhaust passage 5 or the exhaust system structure and thereafter having peeled from the wall surface or the exhaust system structure, arrives at the PM sensor 55, so that it is trapped by the electrodes 551, 552. Hereinafter, in cases where such a phenomenon has occurred, an influence which the peeled PM has on the output value of the PM sensor 55 will be explained based on FIGS. 5(a), 5(b) and 6. FIGS. 5(a), 5(b) are image views showing how PM deposits between the electrodes 551, 552 of the PM sensor 55. FIG. 5(a) shows how PM deposits by ordinary PM contained in the exhaust gas discharged from the internal combustion engine 1 being trapped between the electrodes 551, 552. On the other hand, FIG. 5(b) shows how PM, including ordinary PM and deposits by peeled PM, are trapped between the electrodes 551, 552.

Figure 6:
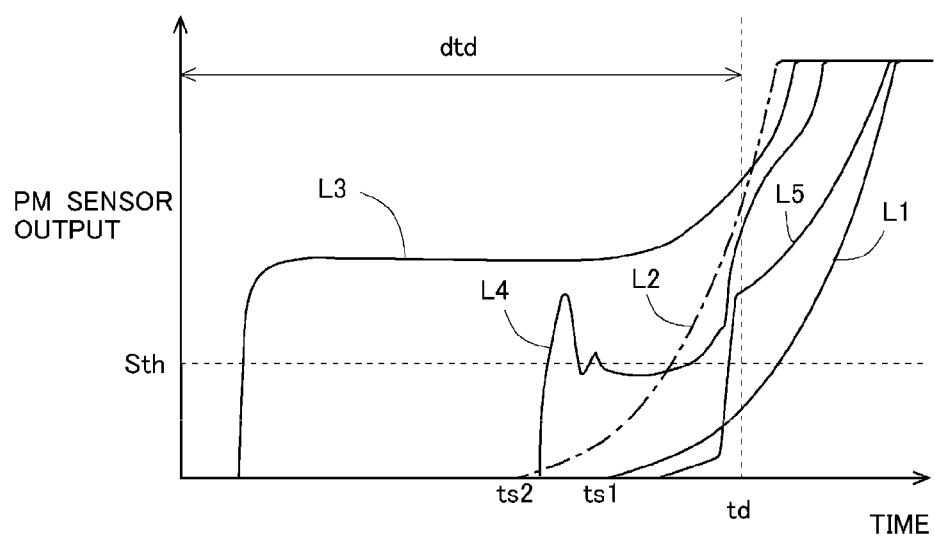
FIG. 6 is a second view showing the change over time of the output value of the PM sensor on and after the voltage application time according to the embodiment.

In addition, FIG. 6 is another view showing the change over time of the output value of the PM sensor 55 on and after the voltage application time, similar to FIG. 4. In FIG. 6, the axis of abscissa represents the period of time elapsed from the voltage application time, and the axis of ordinate represents the output value of the PM sensor 55. Moreover, in FIG. 6, similarly to FIG. 4, a line L1 indicates the change over time of the output value of the PM sensor 55 in the case where the filter 51 is in a normal state, and a line L2 indicates the change over time of the output value of the PM sensor 55 in the case where the filter 51 is in failure. Here, note that each of the lines L1, L2 shows the change over time of the output value of the PM sensor 55 in the case where the amount of PM deposition between the electrodes 551, 552 increases by the ordinary PM being trapped between the electrodes 551, 552 of the PM sensor 55. Further, in FIG. 6, each of lines L3, L4 and L5 shows the change over time of the output value of the PM sensor 55 in the case where the filter 51 is in the normal state. However, each of the lines L3, L4 and L5 shows the change over time of the output value of the PM sensor 55 in the case where the peeled PM, in addition to the ordinary PM, is trapped between the electrodes 551, 552 of the PM sensor 55.

When PM adheres to the wall surface of the exhaust passage 5 or the exhaust system structure, the PM deposits and condenses on the wall surface or the exhaust system structure. The PM thus condensed peels off to become "peeled PM". Thus, the size of the peeled PM is larger than that of the ordinary PM. For that reason, when the peeled PM is trapped between the electrodes 551, 552 of the PM sensor 55, as shown in FIG. 5(b), the amount of PM deposition between the electrodes 551, 552 will increase rapidly, in comparison with the time when only the ordinary PM has been trapped between the electrodes 551, 552 of the PM sensor 55, as shown in FIG. 5(a). As a result, the output value of the PM sensor 55 goes up rapidly.

Here, the lines L3, L4 in FIG. 6 each show the change over time of the output value of the PM sensor 55 in the case where the peeled PM is trapped between the electrodes 551, 552 in a state where the amount of PM deposition between the electrodes 551, 552 of the PM sensor 55 has not reached the effective amount of PM deposition. In such a case, because the size of the peeled PM is larger than that of the ordinary PM, the electrodes 551, 552 will be made conductive with each other by the peeled PM. For that reason, the output value of the PM sensor 55 goes up rapidly at the output starting time (in other words, the slopes of the tangents of the lines L3, L14 at the output starting time become very much larger than those of the lines L1, L2 at the output starting time). Accordingly, the output value of the PM sensor 55 will go up to a greater extent at the output starting time than in the case where the amount of PM deposition exceeds the effective amount of PM deposition due to the gradually increasing amount of deposition of the ordinary PM between the electrodes 551, 552. As a result, there is a fear that although the filter 51 is in the normal state, the output value of the PM sensor 55 at the determination time td may become larger than the abnormality determination value Sth.

The line L5 in FIG. 6 shows the change over time of the output value of the PM sensor 55 in the case where the peeled PM is trapped between the electrodes 551, 552 after the amount of PM deposition between the electrodes 551, 552 of the PM sensor 55 has exceeded the effective amount of PM deposition by the trapping of the ordinary PM. In such a case, the electrodes 551, 552 will also become conductive with each other by the peeled PM, too, at a position in the electrodes 551, 552 different from that at which the electrodes 551, 552 are conductive with each other through the ordinary PM (e.g., it will be in a state shown in FIG. 5(b)). Then, at the time when the peeled PM is trapped, the output value of the PM sensor 55 goes up rapidly (in other words, the slope of the tangent of the line L5 becomes large to a great extent in the middle of this line L5). In such a case, too, there is a fear that although the filter 51 is in the normal state, the output value of the PM sensor 55 at the determination time td may become larger than the abnormality determination value Sth.

However, peeling of the PM from the wall surface of the exhaust passage 5 does not occur continuously. For that reason, although the ordinary PM is continuously trapped between the electrodes 5551, 552, the peeled PM is not trapped continuously. Accordingly, as shown by the lines L3, L4 and L5 in FIG. 6, a rapid rise in the output value of the PM sensor 55 by the trapping of the peeled PM between the electrodes 551, 552 is temporary.

Moreover, as shown by the line L3 in FIG. 6, in the case where the output value of the PM sensor 55 has gone up rapidly due to the peeled PM being trapped between the electrodes 551, 552 in the state where the amount of PM deposition between the electrodes 551, 552 of the PM sensor 55 has not reached the effective amount of PM deposition, thereafter, there occurs a period of time in which the output value of the PM sensor 55 does not appreciably rise, but becomes substantially constant. This is because the amount of deposition of the ordinary PM between the electrodes 551, 552 has not reached the effective amount of PM deposition, and hence, even if the ordinary PM is trapped, the resistance value between the electrodes 551, 552 does not change for a while after the electrodes 551, 552 has become conductive between each other due to the peeled PM. In this case, when the amount of deposition of the ordinary PM between the electrodes 551, 552 reaches the effective amount of PM deposition, the output value of the PM sensor 55 begins to go up again in accordance with the increase in the amount of deposition thereof. In addition, as shown by the line L5 in FIG. 6, in the case where the output value of the PM sensor 55 has gone up rapidly due to the peeled PM being trapped between the electrodes 551, 552 and the PM sensor 55 is in the state where the amount of PM deposition between the electrodes 551, 552 has become equal to or more than the effective amount of PM deposition, thereafter, too, the output value of the PM sensor 55 goes up in accordance with the increase in the amount of deposition of the ordinary PM between the electrodes 551, 552. Moreover, on the line L4 in FIG. 6, the output value of the PM sensor 55 decreases after going up rapidly at the output starting time. This is because after the peeled PM has been trapped between the electrodes 551, 552, a part of the peeled PM thus trapped desorbs from between the electrodes 551, 552, so that the amount of PM deposition between the electrodes 551, 552 decreases.

As mentioned above, when the peeled PM is trapped between the electrodes 551, 552 of the PM sensor 55 in a period of time on and after the voltage application time and before the determination time, the output value of the PM sensor 55 at the determination time td may become larger than the abnormality determination value Sth, though the filter 51 is in the normal state. As a result, in cases where abnormality diagnosis of the filter is carried out by using the output value of the PM sensor 55, as mentioned above, there is a possibility that a wrong diagnosis may be made that abnormality of the filter 51 has occurred, though the filter 51 is in the normal state.

[Method for Deciding Whether to Carry out Filter Abnormality Diagnosis]

Accordingly, in this embodiment, the output signal of the PM sensor 55 on and after the voltage application time is continuously monitored in the monitor unit 101 of the ECU 10. Then, based on the degree of variation of the output value of the PM sensor 55 on and after the output starting time in a period of time from the voltage application time to the determination time, monitored by the monitor unit 101, it is decided whether to carry out abnormality diagnosis of the filter using the output value of the PM sensor 55. In other words, when the degree of variation of the output value of the PM sensor 55 shows that the peeled PM has been trapped between the electrodes 551, 552 of the PM sensor 55, a decision is made that abnormality diagnosis of the filter is not to be carried out.

Specifically, in cases where the rate of rise of the sensor output has become larger than a predetermined first determination rise rate on and after the output starting time, a decision is made based on the output value of the PM sensor 55 at the determination time td that filter diagnostic processing is not to be carried out, which is processing to diagnose abnormality of the filter 51. Here, the rate of rise of the sensor output is an amount of rise of the output value of the PM sensor 55 per unit increase amount of the reference amount of PM deposition between the electrodes 551, 552 of the PM sensor 55 (i.e., an amount of rise of the actual output value of the PM sensor 55 in a period of time in which a unit amount of the estimated reference amount of PM deposition increases). In addition, the first determination rise rate is set to a maximum value of an ordinary rate of rise of the sensor output, which is a rate of rise of the sensor output at the time the output value of the PM sensor 55 increases according to the increasing amount of PM deposition, when the amount of PM deposition between the electrodes 551, 552 has been increased by trapping of the ordinary PM between the electrodes 551, 552. As stated above, in the case where the peeled PM is trapped between the electrodes 551, 552 of the PM sensor 55, the output value of the PM sensor 55 goes up more rapidly than in the case where the amount of PM deposition between the electrodes 551, 552 increases by the ordinary PM being trapped between the electrodes 551, 552. Here, the reference amount of PM deposition is an estimated value of the amount of deposition of the ordinary PM between the electrodes 551, 552 in the case of assuming that the filter 51 is in the reference failure state. Accordingly, in the case where the actual output value of the PM sensor 55 goes up rapidly due to the peeled PM being trapped between the electrodes 551, 552, the rate of rise of the sensor output will go up rapidly. For that reason, in cases where the rate of rise of the sensor output has exceeded the first determination rise rate on and after the output starting time, it can be judged that the degree of variation of the output value of the PM sensor 55 shows, with high probability, that the peeled PM has been trapped between the electrodes 551, 552 of the PM sensor 55. Accordingly, in this embodiment, in such a case, a decision is made that the filter diagnostic processing is not to be carried out.

[Abnormality Diagnosis Flow for Filter]

Figure 7:
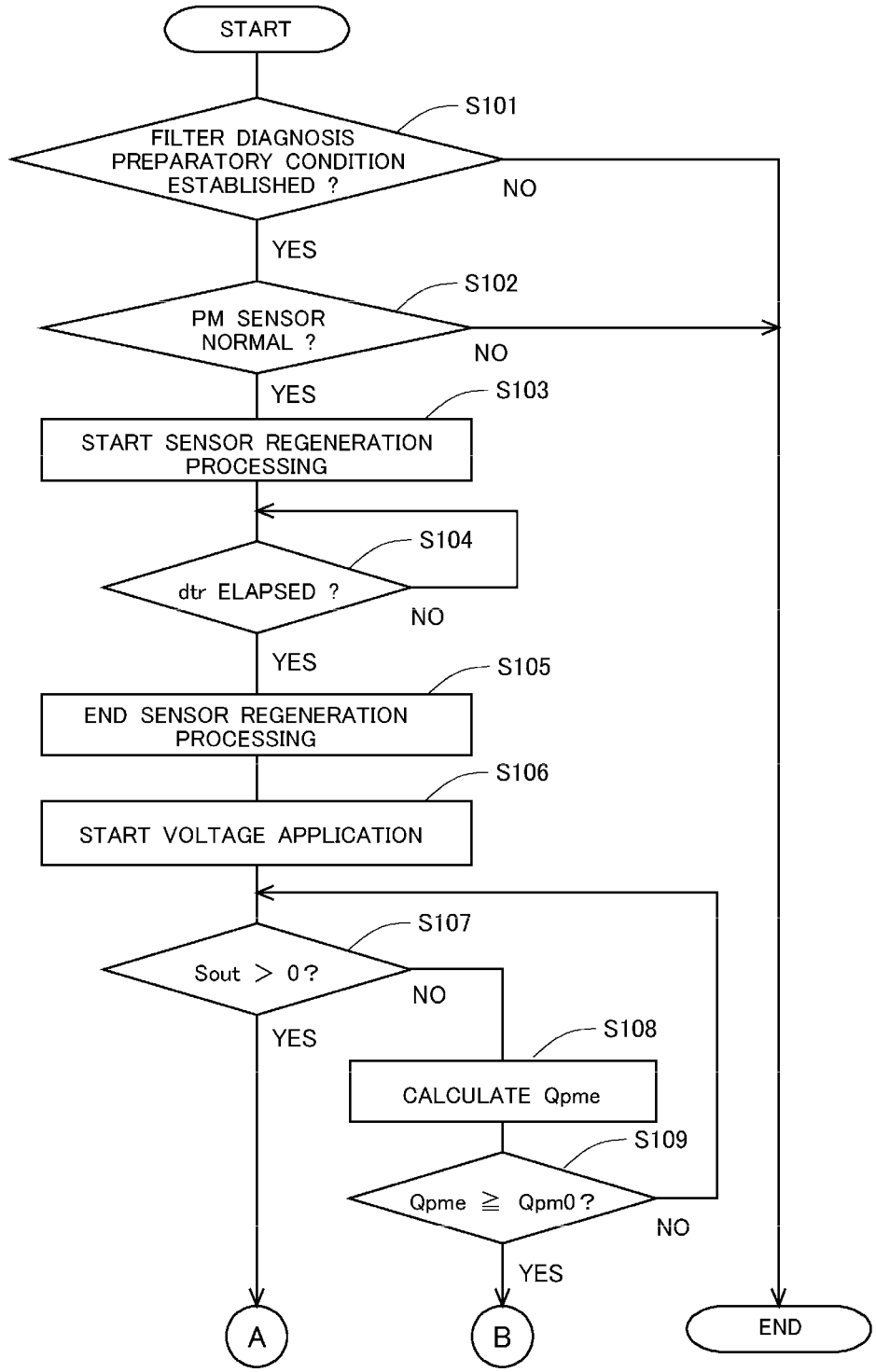
FIG. 7 is a flow chart showing one part of a flow for abnormality diagnosis of a filter according to a first embodiment of the present invention.
Figure 8:
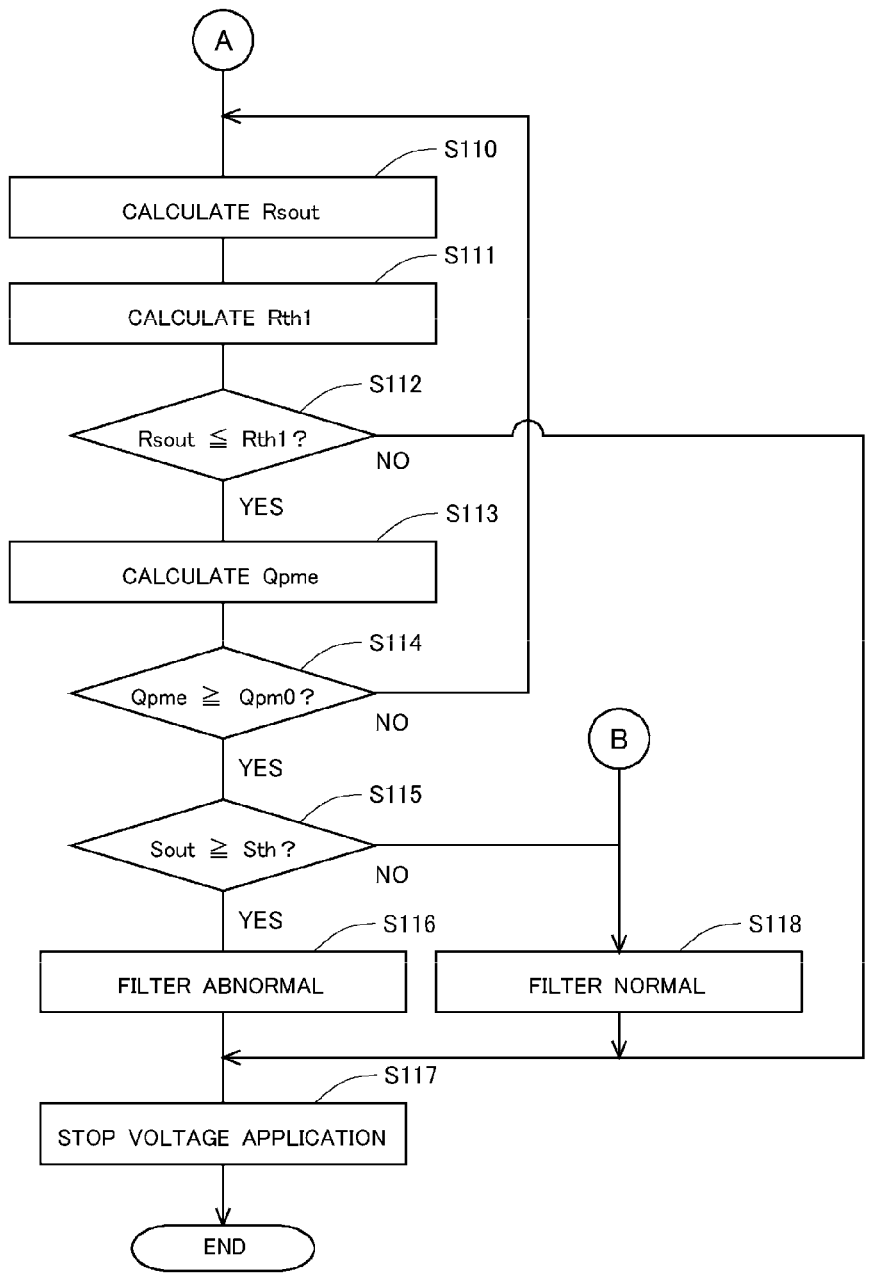
FIG. 8 is a flowchart showing the other part of the flow for abnormality diagnosis of a filter according to the first embodiment of the present invention.

Hereinafter, reference will be made to an abnormality diagnosis flow for a filter according to this embodiment, based on FIGS. 7 and 8. FIGS. 7 and 8 are flow charts showing the abnormality diagnosis flow for a filter according to this embodiment. This flow has been stored in advance in the ECU 10, and is repeatedly carried out by the ECU 10 at a predetermined interval during the operation of the internal combustion engine 1. Here, note that in cases where the PM sensor 55 is provided with an SCU, this flow may be carried out by the SCU.

In this flow, first in step S101, it is determined whether a predetermined filter diagnosis preparatory condition has been established. Here, the filter diagnosis preparatory condition is a condition for carrying out the sensor regeneration processing prior to the filter diagnostic processing. This filter diagnosis preparatory condition is set such that an execution frequency of the filter diagnostic processing can be secured or obtained to a necessary and sufficient extent. As the filter diagnosis preparatory condition, the following can be mentioned by way of example: the operating state of the internal combustion engine 1 is a steady state operation, and at the same time, a predetermined period of time has elapsed from the last execution of the filter diagnostic processing, or a predetermined period of time has elapsed from the start of the current operation of the internal combustion engine 1, etc. In cases where a negative determination is made in step S101, the execution of this flow is ended.

On the other hand, in cases where an affirmative determination is made in step S101, then in step S102, it is determined whether the PM sensor 55 is in the normal state. In this embodiment, an abnormality diagnosis flow for the PM sensor 55 is carried out as a routine outside of this flow, and the result of the diagnosis is stored in the ECU 10. Then, in step S102, the result of the abnormality or failure diagnosis of the PM sensor 55 stored in the ECU 10 is read in. Here, note that as a failure diagnosis method for the PM sensor 55, there may be adopted any well-known method. In cases where a negative determination is made in step S102, the execution of this flow is ended.

On the other hand, in cases where an affirmative determination is made in step S102, then in step S103, sensor regeneration processing is started. That is, the supply of electric power from the power supply 60 to the heater 555 is started. Then, the temperature of the sensor element 553 is controlled to a temperature at which the PM can be oxidized. Subsequently, in step S104, it is determined whether a predetermined regeneration period of time dtr has passed after the sensor regeneration processing is started in step S103. Here, the regeneration period of time dtr may be a fixed value which has been set in advance based on experiments, etc., as a sufficient period of time to remove the PM deposited between the electrodes 551, 552 of the PM sensor 55. In addition, the amount of PM deposition between the electrodes 551, 552 at the time of the start of the sensor regeneration processing may be estimated, and the regeneration period of time dtr may be set based on the amount of PM deposition thus estimated. In cases where a negative determination is made in step S104, the processing of the step S104 is carried out again. On the other hand, in cases where an affirmative determination is made in step S104, then in step S105, the sensor regeneration processing is ended. That is, the supply of electric power from the power supply 60 to the heater 555 is stopped. The amount of PM deposition between the electrodes 551, 552 of the PM sensor 55 at this point in time becomes substantially zero.

Subsequently, in step S106, the application of voltage to the electrodes 551, 552 of the PM sensor 55 is started. With this, PM begins to deposit again between the electrodes 551, 552. Here, note that, as stated above, a cooling-off period for cooling the electrodes 551, 552 may be provided from the end of the sensor regeneration processing until the start of the voltage application to the electrodes 551, 552 of the PM sensor 55. Thereafter, in step S107, it is determined whether the output value Sout of the PM sensor 55 is larger than zero.

When the amount of PM deposition between the electrodes 551, 552 of the PM sensor 55 has become equal to or more than the effective amount of PM deposition, an affirmative determination will be made in step S107. The time when the affirmative determination is made in step S107 corresponds to the output starting time.

In cases where a negative determination is made in step S107, then in step S108, a reference amount of PM deposition Qpme is calculated. Here, the reference amount of PM deposition Qpme is calculated based on the operating state of the internal combustion engine 1 and the amount of PM deposition in the filter 51 in the case of assuming that the filter 51 is in the reference failure state. Here, note that the amount of PM deposition in the filter 51 in the case of assuming that the filter 51 is in the reference failure state can be calculated by estimating the amount of PM trapped by the filter 51 in the case of assuming that the filter 51 is in the reference failure state, and the amount of PM removal which is oxidized and removed from the filter 51 by a rise in the temperature of the exhaust gas, and by integrating these estimated values. Subsequently, in step S109, it is determined whether the reference amount of PM deposition Qpme calculated in step S108 is equal to or more than a determination amount of PM deposition Qpm0. In cases where a negative determination is made in step S112, the processing of the step S107 is carried out again. On the other hand, in cases where an affirmative determination is made in step S109, i.e., in cases where the reference amount of PM deposition Qpme has reached the determination amount of PM deposition Qpm0, while the output value of the PM sensor 55 is maintained at zero, it can be judged that the determination period of time dtd has passed from the voltage application time, before the amount of PM deposition between the electrodes 551, 552 of the PM sensor 55 reaches the effective amount of PM deposition. In this case, the processing of step S118 to be described later is carried out.

On the other hand, in cases where an affirmative determination is made in step S107, then in step S110, the rate of rise of the sensor output Rsout of the PM sensor 55 is calculated. At this time, in step S110, the rate of rise of the sensor output at the output starting time will be calculated.

Subsequently, in step S111, a first determination rise rate Rth1 is calculated. As stated above, the first determination rise rate Rth1 is calculated as the maximum value of the ordinary rate of rise of the sensor output. Accordingly, for example, the first determination rise rate Rth1 may be calculated as the ordinary rate of rise of the sensor output in the case of assuming that the filter 51 does not exist in the exhaust passage 5. Here, even in cases where the filter 51 does not exist in the exhaust passage 5, the amount of PM discharged from the internal combustion engine 1 is varied according to the operating state of the internal combustion engine 1. In addition, as stated above, the PM trapping rate also varies according to the flow rate of the exhaust gas. Accordingly, first of all, the amount of deposition of ordinary PM between the electrodes 551, 552 in the case of assuming that the filter 51 does not exist in the exhaust passage 5 is estimated based on the operating state of the internal combustion engine 1. Then, the first determination rise rate Rth1 may be calculated based on an amount of rise of the output value of the PM sensor 55 according to an increased amount of the estimated amount of deposition of the ordinary PM between the electrodes 551, 552, and an increased amount of the reference amount of PM deposition.

Thereafter, in step S112, it is determined whether the rate of rise of the sensor output Rsout calculated in step S110 is equal to or less than the first determination rise rate Rth1 calculated in step S111. In cases where an affirmative determination is made in step S112, it can be judged that the peeled PM has not been trapped between the electrodes 551, 552 at the current point in time. In this case, then in step S113, the reference amount of PM deposition Qpme is calculated by the same method as in step S108.

Subsequently, in step S114, it is determined whether the reference amount of PM deposition Qpme calculated in step S113 is equal to or more than the determination amount of PM deposition Qpm0. In cases where a negative determination is made in step S114, the processing of the step S110 is carried out again. In this case, in step S110, the rate of rise of the sensor output Rsout at a time after the output starting time will be calculated. On the other hand, in cases where an affirmative determination is made in step S114, it can be judged that the determination period of time dtd has elapsed from the voltage application time, without the peeled PM being trapped between the electrodes 551, 552 of the PM sensor 55. Accordingly, in this case, it is decided that the filter diagnostic processing is carried out based on the output value of the PM sensor 55 at the determination time td. For that reason, when an affirmative determination is made in step S114, then in step S115, the filter diagnostic processing is carried out. Specifically, it is determined whether the output value Sout of the PM sensor 55 at the time when the reference amount of PM deposition Qpme has reached the determination amount of PM deposition Qpm0 (i.e., the output value of the PM sensor 55 at the determination time td) is equal to or more than the abnormality determination value Sth. In cases where an affirmative determination is made in step S115, then in step S116, a determination is made that an abnormality has occurred in the filter 51. On the other hand, in cases where a negative determination is made in step S115, then in step S118, a determination is made that no abnormality has occurred in the filter 51, i.e., the filter 51 is in the normal state. Here, note that in cases where an affirmative determination is made in step S109, the determination period of time dtd has elapsed from the voltage application time, without the peeled PM being trapped between the electrodes 551, 552 of the PM sensor 55, and the output value Sout of the PM sensor 55 at the time when the reference amount of PM deposition Qpme has reached the determination amount of PM deposition Qpm0 is zero, and hence is of course smaller than the abnormality determination value Sth. For that reason, in this case, then in step S118, a determination is made that the filter 51 is in the normal state. After the determination of abnormality or normality of the filter 51 in step S116 or S118 has been made, in step S117, the application of voltage to the electrodes 551, 552 of the PM sensor 55 is stopped.

In addition, in cases where a negative determination is made in step S112, i.e., in cases where it is determined that the rate of rise of the sensor output Rsout is larger than the first determination rise rate Rth1, it can be judged that the peeled PM was trapped between the electrodes 551, 552 of the PM sensor 55, before the determination period of time dtd has elapsed from the voltage application time. Accordingly, in this case, it is decided that the filter diagnostic processing based on the output value of the PM sensor 55 at the determination time td is not to be carried out. For that reason, in cases where a negative determination is made in step S112, then in step S117, the application of voltage to the electrodes 551, 552 of the PM sensor 55 is stopped. In other words, the voltage application to the electrodes 551, 552 is stopped, without carrying out the filter diagnostic processing. Here, note that in cases where a negative determination is made in step S112, it is not necessary to stop the voltage application to the electrodes 551, 552 of the PM sensor 55 immediately. In other words, even in cases where a negative determination is made in step S112, the reference amount of PM deposition Qpme may be calculated, and the voltage application to the electrodes 551, 552 may be continued until the reference amount of PM deposition Qpme thus calculated reaches the determination amount of PM deposition Qpm0. However, in this case, too, the filter diagnostic processing is not carried out, when the reference amount of PM deposition Qpme reaches the determination amount of PM deposition Qpm0, i.e., based on the output value of the PM sensor 55 at the determination time td. In addition, in cases where a negative determination is made in step S112, in order to remove the peeled PM trapped between the electrodes 551, 552, the execution of the sensor regeneration processing may be started, and the processing after step S103 may be carried out again. Cases when a negative determination is made in step S112, and the filter diagnostic processing is not carried out but instead other processings are carried out, correspond to the expression "said decision unit decides that the filter diagnostic processing by the filter diagnostic unit is not carried out" in embodiments of the present invention.

According to the above-mentioned abnormality diagnosis flow for a filter, in cases where the peeled PM was trapped between the electrodes 551, 552 of the PM sensor 55 before the determination period of time dtd has elapsed from the voltage application time, the filter diagnostic processing is not to be carried out. For that reason, in the filter diagnostic processing, it is possible to suppress an erroneous or wrong diagnosis that abnormality of the filter 51 has occurred, resulting from the peeled PM being trapped between the electrodes 551, 552 of the PM sensor 55, in spite of the fact that the filter 51 is actually in the normal state. Accordingly, it is possible to enhance the accuracy of the diagnosis in the filter diagnostic processing.

Here, note that in the abnormality diagnosis for a filter according to this embodiment, the first determination rise rate Rth1, which is a threshold value at the time of deciding whether to carry out the filter diagnostic processing, may be set to a value which is larger than the maximum value of the ordinary rate of rise of the sensor output. For example, the first determination rise rate Rth1 may be set to a value which is larger than the ordinary rate of rise of the sensor output in the case of assuming that the filter 51 does not exist in the exhaust passage 5. In addition, the first determination rise rate Rth1 may be set to a predetermined fixed value. In this case, the first determination rise rate Rth1 is set, based on experiments, etc., as a threshold value with which it can be judged that the output value of the PM sensor 55 went up because peeled PM is trapped between the electrodes 551, 552, and is stored in the ECU 10 in advance.

Moreover, in this embodiment, the rate of rise of the sensor output Rsout is calculated as a parameter used for the abnormality diagnosis of the filter, but instead of this, a value correlated with the rate of rise of the sensor output may be used as such a parameter. For example, a difference between a first output value of the PM sensor 55 and a reference amount of PM deposition at the time when the first output value was detected is defined as a first output difference, and a difference between a second output value of the PM sensor 55 after the lapse of a predetermined period of time from the time when the first output value was outputted and a reference amount of PM deposition at the time when the second output value was detected is defined as a second output difference, wherein abnormality diagnosis may be carried out by using, as a parameter, a difference between the first output difference and the second output difference, or a ratio of these values.

Second Embodiment

This second embodiment is different from the above-mentioned first embodiment in a specific determination method for determining whether to execute or carry out filter diagnostic processing. In this second embodiment, in cases where the rate of rise of the sensor output became smaller than a predetermined second determination rise rate after the output starting time, it is decided that the filter diagnostic processing is not to be carried out. Here, the second determination rise rate is set to a minimum value of the ordinary rate of rise of the sensor output.

As mentioned above, a rapid rise in the output value of the PM sensor 55 by the peeled PM being trapped between the electrodes 551, 552 is temporary. In addition, as shown by the line L3 in FIG. 6, in the case where the output value of the PM sensor 55 has gone up rapidly by the peeled PM being trapped between the electrodes 551, 552 in the state where the amount of PM deposition between the electrodes 551, 552 of the PM sensor 55 has not reached the effective amount of PM deposition, thereafter, there occurs a period of time in which the output value of the PM sensor 55 becomes substantially constant. In this case, the rate of rise of the sensor output becomes substantially zero. Moreover, as shown by the line L4 in FIG. 6, in cases where after the peeled PM was trapped between the electrodes 551, 552, a part of the peeled PM thus trapped desorbs from between the electrodes 551, 552, the output value of the PM sensor 55 decreases. In this case, the rate of rise of the sensor output becomes a negative value. As a result, in the case where on and after the output starting time, the rate of rise of the sensor output became smaller than the second determination rise rate, it can be judged that the degree of variation of the output value of the PM sensor 55 shows, with high probability, that the peeled PM has been trapped between the electrodes 551, 552 of the PM sensor 55. Accordingly, in this second embodiment, in such a case, a decision is made that the filter diagnostic processing is not to be carried out.

[Abnormality Diagnosis Flow for Filter]

Figure 9:
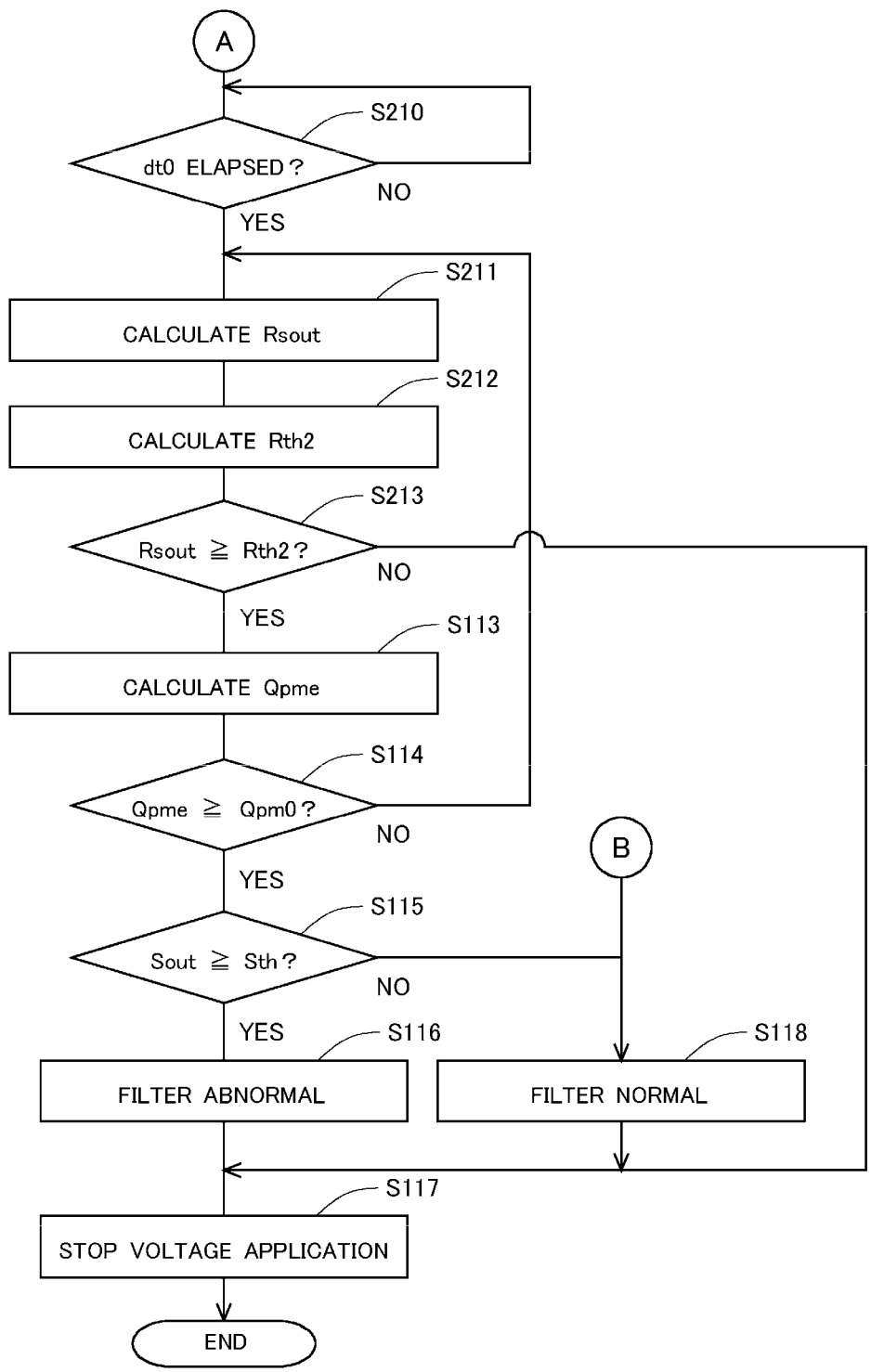
FIG. 9 is a flow chart showing one part of a flow for abnormality diagnosis of a filter according to a second embodiment of the present invention.

Hereinafter, reference will be made to an abnormality diagnosis flow for a filter according to this second embodiment, based on FIG. 9. FIG. 9 is a flow chart showing a part of the abnormality diagnosis flow for a filter according to this second embodiment. Here, note that in the abnormality diagnosis flow for a filter according to this second embodiment, the other part of the flow before step S208 is the same as the flow (from step S101 to step S109) shown in FIG. 7. In addition, steps from S113 to S118 are the same as those in the flow shown in FIG. 8. For that reason, the explanation of the part of the flow of this second embodiment which has been already described is omitted. This flow has been stored in advance in the ECU 10, and is repeatedly carried out by the ECU 10 at a predetermined interval during the operation of the internal combustion engine 1. Here, note that in cases where the PM sensor 55 is provided with an SCU, this flow may be carried out by the SCU.

In this flow, in cases where an affirmative determination is made in step S107 of the flow shown in FIG. 7, then in step S210, it is determined whether a predetermined period of time dt0 has elapsed from the time when the output value of the PM sensor 55 began to go up from zero (i.e., from the output starting time). Here, the predetermined period of time dt0 is set as a period of time in which if the predetermined period of time dt0 has elapsed from the output starting time, a judgment can be made as to whether the peeled PM has been trapped, based on whether the rate of rise of the sensor output is smaller than the second determination rise rate. The predetermined period of time dt0 can be beforehand determined based on experiments, etc. In cases where a negative determination is made in step S210, the processing of the step S210 is carried out again.

On the other hand, in cases where an affirmative determination is made in step S210, then in step S211, the rate of rise of the sensor output Rsout of the PM sensor 55 is calculated. In other words, in step S211, the rate of rise of the sensor output later than the output starting time will be calculated.

Subsequently, in step S212, a second determination rise rate Rth2 is calculated. As stated above, the second determination rise rate Rth2 is calculated as the minimum value of the ordinary rate of rise of the sensor output. Accordingly, for example, the second determination rise rate Rth2 may be calculated as the ordinary rate of rise of the sensor output in the case of assuming that the filter 51 has not been deteriorated (i.e., the filter 51 is a new one). Here, the amount of PM outflowing from the filter 51 in the case of assuming that the filter 51 has not been deteriorated varies according to the operating state of the internal combustion engine 1 and the amount of PM deposition in the filter 51 in the case of assuming that the filter 51 has not been deteriorated. In addition, as stated above, the PM trapping rate also varies according to the flow rate of the exhaust gas. Accordingly, first of all, the amount of deposition of the ordinary PM between the electrodes 551, 552 in the case of assuming that the filter 51 has not been deteriorated is estimated based on the operating state of the internal combustion engine 1 and the amount of PM deposition in the filter 51 in the case of assuming that the filter 51 has not been deteriorated. Then, the second determination rise rate Rth2 may be calculated based on an amount of rise of the output value of the PM sensor 55 according to an increased amount of the estimated amount of deposition of the ordinary PM between the electrodes 551, 552, and an increased amount of the reference amount of PM deposition. Here, note that the amount of PM deposition in the filter 51 in the case of assuming that the filter 51 has not been deteriorated can be calculated by estimating the amount of PM trapped by the filter 51 in the case of assuming that the filter 51 has not been deteriorated, and the amount of PM removal which is oxidized and removed from the filter 51 by a rise in the temperature of the exhaust gas, and by integrating these estimated values.

Thereafter, in step S213, it is determined whether the rate of rise of the sensor output Rsout calculated in step S211 is equal to or more than the second determination rise rate Rth2 calculated in step S212. In cases where an affirmative determination is made in step S211, it can be judged that the peeled PM has not been trapped between the electrodes 551, 552 at the current point in time. In this case, the processing of step S113 is then carried out. In addition, in this flow, in cases where a negative determination is made in step S114, then, the processing of the steps from S104 to S213 is carried out again.

On the other hand, in cases where a negative determination is made in step S213, i.e., in cases where it is determined that the rate of rise of the sensor output Rsout is smaller than the second determination rise rate Rth2, it can be judged that the peeled PM was trapped between the electrodes 551, 552 of the PM sensor 55, before the determination period of time dtd has elapsed from the voltage application time. Accordingly, in this case, it is decided that the filter diagnostic processing based on the output value of the PM sensor 55 at the determination time td is not to be carried out. For that reason, in cases where a negative determination is made in step S213, then in step S117, the application of voltage to the electrodes 551, 552 of the PM sensor 55 is stopped, similarly as in the case where a negative determination is made in step S112 of the flow shown in FIG. 8. Here, note that in this case, other processing may be carried out, similarly as in the case where a negative determination is made in step S112 of the flow shown in FIG. 8.

According to the above-mentioned abnormality diagnosis flow for a filter, in cases where after the voltage application time, the output value of the PM sensor 55 began to go up from zero by the peeled PM being trapped between the electrodes 551, 552 of the PM sensor 55, the filter diagnostic processing is not to be carried out. For that reason, in the filter diagnostic processing, it is possible to suppress an erroneous or wrong diagnosis that abnormality of the filter 51 has occurred, resulting from the peeled PM being trapped between the electrodes 551, 552 of the PM sensor 55, in spite of the fact that the filter 51 is actually in the normal state.

Here, note that in the abnormality diagnosis for a filter according to this second embodiment, the second determination rise rate Rth2, which is a threshold value at the time of deciding whether to carry out the filter diagnostic processing, may be set to a value which is smaller than the minimum value of the ordinary rate of rise of the sensor output. For example, the second determination rise rate Rth2 may be set to a value which is smaller than the ordinary rate of rise of the sensor output in the case of assuming that the filter 51 has not been deteriorated. In addition, the second determination rise rate Rth2 may be set to a predetermined fixed value. In this case, the second determination rise rate Rth2 is set, based on experiments, etc., as a threshold value with which it can be judged that the output value of the PM sensor 55 became substantially constant or decreased after having gone up rapidly resulting from the peeled PM being trapped between the electrodes 551, 552, and is stored in the ECU 10 in advance.

Further, in this second embodiment, too, the rate of rise of the sensor output Rsout is calculated as a parameter used for the abnormality diagnosis of the filter, but instead of this, a value correlated with the rate of rise of the sensor output may be used as such a parameter, similar to the abnormality diagnosis of the filter according to the first embodiment.

Third Embodiment

This third embodiment is different from the above-mentioned first embodiment in a specific determination method for determining whether to execute or carry out filter diagnostic processing. In this third embodiment, in cases where the rate of rise of the sensor output decreased after the output starting time, it is decided that the filter diagnostic processing is not to be carried out.

As mentioned above, in cases where the output value of the PM sensor 55 begins to go up because the amount of deposition of the ordinary PM between the electrodes 551, 552 reaches the effective amount of PM deposition, the output value of the PM sensor 55 goes up continuously in accordance with the continuous increase in the amount of deposition of the ordinary PM, after the output starting time, too. Thus, the larger the amount of PM deposition between the electrodes 551, 552 of the PM sensor 55, the larger becomes the amount of rise of the output value of the PM sensor 55 with respect to the amount of increase in the amount of PM deposition. Accordingly, in cases where the output value of the PM sensor 55 goes up in accordance with the continuous increase in the amount of deposition of the ordinary PM between the electrodes 551, 552, the rate of rise of the sensor output will go up gradually on and after the output starting time.

On the other hand, the rapid rise in the output value of the PM sensor 55 due to the peeled PM trapped between the electrodes 551, 552 is temporary. Then, even in cases where the output value of the PM sensor 55 has gone up rapidly due to the peeled PM being trapped between the electrodes 551, 552 of the PM sensor 55, thereafter, the output value of the PM sensor 55 becomes substantially constant, as shown by the line L3 in FIG. 6, or the output value of the PM sensor 55 decreases, as shown by the line L4 in FIG. 6, or the degree of rise of the output value of the PM sensor 55 becomes to such an extent so as to correspond to the increase in the amount of deposition of the ordinary PM between the electrodes 551, 552, as shown by the line L5 in FIG. 6. For that reason, after the output value of the PM sensor 55 has gone up rapidly, the rate of rise of the sensor output will become lower, in any of the above cases, than the rate of rise of the sensor output at the time when the output value of the PM sensor 55 has gone up rapidly. Accordingly, in cases where the rate of rise of the sensor output decreased after the output starting time, it can be judged that this degree of variation of the output value of the PM sensor 55 shows, with high probability, that the peeled PM has been trapped between the electrodes 551, 552 of the PM sensor 55. As a result, in this third embodiment, in such a case, a decision is made that the filter diagnostic processing is not to be carried out.

Abnormality Diagnosis Flow for Filter

Figure 10:
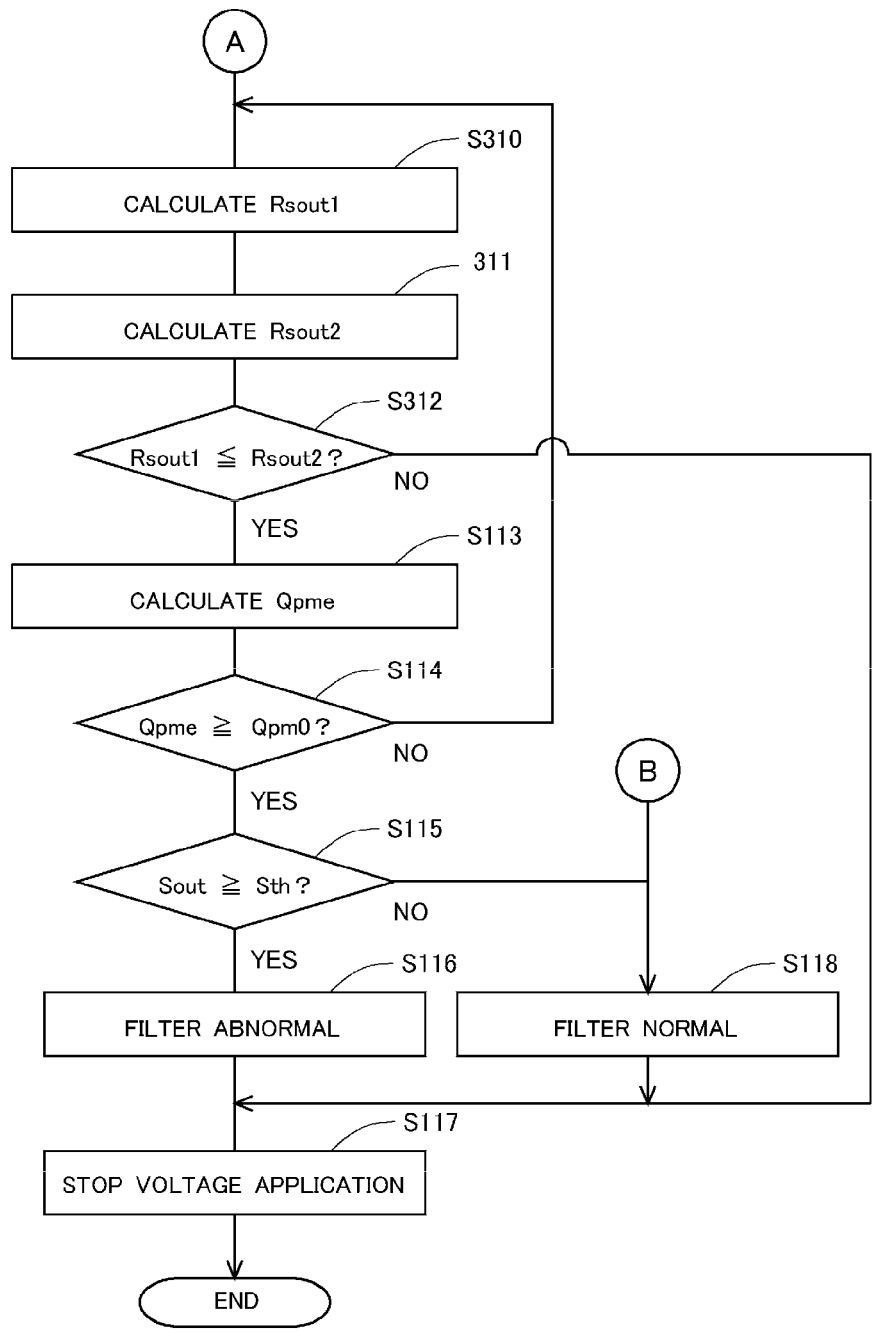
FIG. 10 is a flow chart showing one part of a flow for abnormality diagnosis of a filter according to a third embodiment of the present invention.

Hereinafter, reference will be made to an abnormality diagnosis flow for a filter according to this third embodiment, based on FIG. 10. FIG. 10 is a flow chart showing a part of the abnormality diagnosis flow for a filter according to this third embodiment. Here, note that in the abnormality diagnosis flow for a filter according to this third embodiment, the other part of the flow before step S308 is the same as the flow (from step S101 to step S109) shown in FIG. 7. In addition, steps from S113 to S118 are the same as those in the flow shown in FIG. 8. For that reason, the explanation of the part of the flow of this third embodiment which has been already described is omitted. This flow has been stored in advance in the ECU 10, and is repeatedly carried out by the ECU 10 at a predetermined interval during the operation of the internal combustion engine 1. Here, note that in cases where the PM sensor 55 is provided with an SCU, this flow may be carried out by the SCU.

In this flow, in cases where an affirmative determination is made in step S107 of the flow shown in FIG. 7, then in step S310, a rate of rise of the sensor output Rsout1 of the PM sensor 55 is calculated. Hereinafter, the rate of rise of the sensor output calculated in step S310 is referred to as a "first sensor output rise rate Rsout1". Subsequently, in step S311, a rate of rise of the sensor output Rsout2 of the PM sensor 55, after the lapse of a predetermined period of time from the time when the first sensor output rise rate Rsout1 is calculated in step S310, is calculated. Hereinafter, the rate of rise of the sensor output calculated in step S311 is referred to as a "second sensor output rise rate Rsout2".

Thereafter, in step S312, it is determined whether the first sensor output rise rate Rsout1 calculated in step S310 is equal to or less than the second sensor output rise rate Rsout2 calculated in step S311. In cases where an affirmative determination is made in step S312, it can be judged that the peeled PM has not been trapped between the electrodes 551, 552 at the current point in time. In this case, the processing of step S111 is then carried out. In addition, in this flow, in cases where a negative determination is made in step S114, then, the processing of the steps from S310 to S312 is carried out again. In other words, a comparison between the rates of rise of the sensor output before and after a predetermined period of time is carried out in a repeated manner.

On the other hand, in cases where a negative determination is made in step S212, i.e., in cases where it is determined that the rate of rise of the sensor output has decreased, it can be judged that the peeled PM was trapped between the electrodes 551, 552 of the PM sensor 55, before the determination period of time dtd has elapsed from the voltage application time. Accordingly, in this case, it is decided that the filter diagnostic processing based on the output value of the PM sensor 55 at the determination time td is not to be carried out. For that reason, in cases where a negative determination is made in step S312, then in step S115, the application of voltage to the electrodes 551, 552 of the PM sensor 55 is stopped, similarly as in the case where a negative determination is made in step S112 of the flow shown in FIG. 8. Here, note that in this case, other processing may be carried out, similarly as in the case where a negative determination is made in step S112 of the flow shown in FIG. 8.

According to the above-mentioned abnormality diagnosis flow for a filter, in cases where the peeled PM was trapped between the electrodes 551, 552 of the PM sensor 55 before the determination period of time dtd has elapsed from the voltage application time, the filter diagnostic processing is not to be carried out. For that reason, in the filter diagnostic processing, it is possible to suppress an erroneous or wrong diagnosis that abnormality of the filter 51 has occurred, resulting from the peeled PM being trapped between the electrodes 551, 552 of the PM sensor 55, in spite of the fact that the filter 51 is actually in the normal state.

Here, note that in this third embodiment, the rates of rise of the sensor output Rsout1, Rsout2 are calculated as parameters used for the abnormality diagnosis of the filter, but instead of this, values correlated with the rates of rise of the sensor output may be used as such parameters, similar to the first embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An abnormality diagnostic device for a particulate filter which is arranged in an exhaust passage of an internal combustion engine for trapping particulate matter (PM) in an exhaust gas, said device comprising:
a PM sensor that is arranged in the exhaust passage at a downstream side of said particulate filter, has a pair of electrodes as a sensor element, and is to output a signal corresponding to an amount of PM deposition when said electrodes are made conductive with each other due to deposition of PM between said electrodes;
a sensor regeneration device that executes sensor regeneration processing in which the PM deposited between the electrodes of said PM sensor is removed;
a voltage application device that starts voltage application to the electrodes of said PM sensor at a predetermined voltage application time after the execution of said sensor regeneration processing by said sensor regeneration device ends; and
an electronic controller comprising:
a filter diagnostic unit configured to carry out filter diagnostic processing in which abnormality of said particulate filter is diagnosed based on an output value of said PM sensor, the output value of said PM sensor being outputted when a predetermined determination period of time has elapsed from said voltage application time;
a monitor unit configured to continuously monitor the output value of said PM sensor on and after said voltage application time;
a decision unit configured to decide whether said filter diagnostic processing is to be carried out by said filter diagnostic unit, based on a degree of variation in the output value of said PM sensor monitored by said monitor unit on and after an output starting time at which the output value of said PM sensor begins to go up from zero, in a period of time in which said determination period of time elapses after said voltage application time; and
a rise rate calculation unit configured to calculate a rate of rise of a sensor output, which is an amount of rise of the output value of said PM sensor monitored by said monitor unit, per unit amount of increase of an amount of PM deposition between said electrodes of said PM sensor at a time of assuming that said particulate filter is in a reference failure state,
wherein, in cases where said rate of rise of the sensor output calculated by said rise rate calculation unit has become larger than a predetermined first determination rise rate on and after said output starting time, said decision unit is to decide that said filter diagnostic processing by said filter diagnostic unit is not to be carried out.

2. The abnormality diagnostic device for a particulate filter as set forth in claim 1, wherein said first determination rise rate is set to a value equal to or more than a maximum value of said rate of rise of the sensor output when the output value of said PM sensor goes up according to an increase in the amount of PM deposition, where the amount of PM deposition between said electrodes has increased by trapping, between said electrodes, of PM which has been discharged from the internal combustion engine and has arrived at said PM sensor, without previously adhering to a wall surface of the exhaust passage or an exhaust system structure.

3. An abnormality diagnostic device for a particulate filter which is arranged in an exhaust passage of an internal combustion engine for trapping particulate matter (PM) in an exhaust gas, said device comprising:
a PM sensor that is arranged in the exhaust passage at a downstream side of said particulate filter, has a pair of electrodes as a sensor element, and is to output a signal corresponding to an amount of PM deposition when said electrodes are made conductive with each other due to deposition of PM between said electrodes;
a sensor regeneration device that executes sensor regeneration processing in which the PM deposited between the electrodes of said PM sensor is removed;
a voltage application device that starts voltage application to the electrodes of said PM sensor at a predetermined voltage application time after the execution of said sensor regeneration processing by said sensor regeneration device ends; and an electronic controller comprising:
- a filter diagnostic unit configured to carry out filter diagnostic processing in which abnormality of said particulate filter is diagnosed based on an output value of said PM sensor, the output value of said PM sensor being outputted when a predetermined determination period of time has elapsed from said voltage application time;
- a monitor unit configured to continuously monitor the output value of said PM sensor on and after said voltage application time;
- a decision unit configured to decide whether said filter diagnostic processing is to be carried out by said filter diagnostic unit, based on a degree of variation in the output value of said PM sensor monitored by said monitor unit on and after an output starting time at which the output value of said PM sensor begins to go up from zero, in a period of time in which said determination period of time elapses after said voltage application time; and
- a rise rate calculation unit configured to calculate a rate of rise of a sensor output, which is an amount of rise of an output value of said PM sensor, to be monitored by said monitor unit, per unit amount of increase of an amount of PM deposition between said electrodes of said PM sensor at the time of assuming that said particulate filter is in a reference failure state,
  - wherein, in cases where said rate of rise of the sensor output calculated by said rise rate calculation unit has become smaller than a predetermined second determination rise rate after said output starting time, said decision unit is to decide that said filter diagnostic processing by said filter diagnostic unit is not to be carried out.

4. The abnormality diagnostic device for a particulate filter as set forth in claim 3, wherein said second determination rise rate is set to a value equal to or less than a minimum value of said rate of rise of the sensor output when the output value of said PM sensor goes up according to an increase in the amount of PM deposition, where the amount of PM deposition between said electrodes has increased by trapping, between said electrodes, of PM which has been discharged from the internal combustion engine and has arrived at said PM sensor, without previously adhering to a wall surface of the exhaust passage or an exhaust system structure.

5. An abnormality diagnostic device for a particulate filter which is arranged in an exhaust passage of an internal combustion engine for trapping particulate matter (PM) in an exhaust gas, said device comprising:

a PM sensor that is arranged in the exhaust passage at a downstream side of said particulate filter, has a pair of electrodes as a sensor element, and is to output a signal corresponding to an amount of PM deposition when said electrodes are made conductive with each other due to deposition of PM between said electrodes;

a sensor regeneration device that executes sensor regeneration processing in which the PM deposited between the electrodes of said PM sensor is removed;

a voltage application device that starts voltage application to the electrodes of said PM sensor at a predetermined voltage application time after the execution of said sensor regeneration processing by said sensor regeneration device ends; and an electronic controller comprising:
- a filter diagnostic unit configured to carry out filter diagnostic processing in which abnormality of said particulate filter is diagnosed based on an output value of said PM sensor, the output value of said PM sensor being outputted when a predetermined determination period of time has elapsed from said voltage application time;
- a monitor unit configured to continuously monitor the output value of said PM sensor on and after said voltage application time;
- a decision unit configured to decide whether said filter diagnostic processing is to be carried out by said filter diagnostic unit, based on a degree of variation in the output value of said PM sensor monitored by said monitor unit on and after an output starting time at which the output value of said PM sensor begins to go up from zero, in a period of time in which said determination period of time elapses after said voltage application time; and
- a rise rate calculation unit configured to calculate a rate of rise of a sensor output, which is an amount of rise of an output value of said PM sensor, to be monitored by said monitor unit, per unit amount of increase of an amount of PM deposition between said electrodes of said PM sensor at a time of assuming that said particulate filter is in a reference failure state,
  - wherein, in cases where said rate of rise of the sensor output calculated by said rise rate calculation unit decreased after said output starting time, said decision unit decides that said filter diagnostic processing by said filter diagnostic unit is not to be carried out.

* * * * *